United States Patent [19]

Davis et al.

[11] 4,103,329

[45] Jul. 25, 1978

[54] DATA PROCESSING SYSTEM WITH IMPROVED BIT FIELD HANDLING

[75] Inventors: Michael Ian Davis, Kings Worthy near Winchester, England; Robert Allen Hood; Gary Wayne Mayes, both of Boca Raton, Fla.

[73] Assignee: International Business Machines Corporation, Armonk, N.Y.

[21] Appl. No.: 755,105

[22] Filed: Dec. 28, 1976

[51] Int. Cl.² ............................................... G06F 9/06
[52] U.S. Cl. .................................................. 364/200
[58] Field of Search ... 364/200 MS File, 900 MS File

[56] References Cited
U.S. PATENT DOCUMENTS

| 3,401,375 | 9/1968 | Bell et al. .............................. 364/200 |
| 3,614,746 | 10/1971 | Klinkhamer ......................... 364/200 |
| 3,624,616 | 11/1971 | Patel ..................................... 364/200 |
| 3,654,621 | 4/1972 | Bock et al. ........................... 364/200 |

*Primary Examiner*—Harvey E. Springborn
*Attorney, Agent, or Firm*—Edward S. Gershuny

[57] ABSTRACT

Hardware facilities are described whereby the handling of data represented by variable length fields of bits may be made faster, use less storage and be less prone to errors in programming. The bit fields are handled independently of the natural storage addressing elements and boundaries. Data may be packed into main storage with the highest efficiency, and manipulated with a fast and efficient hardware instruction set.

4 Claims, 28 Drawing Figures

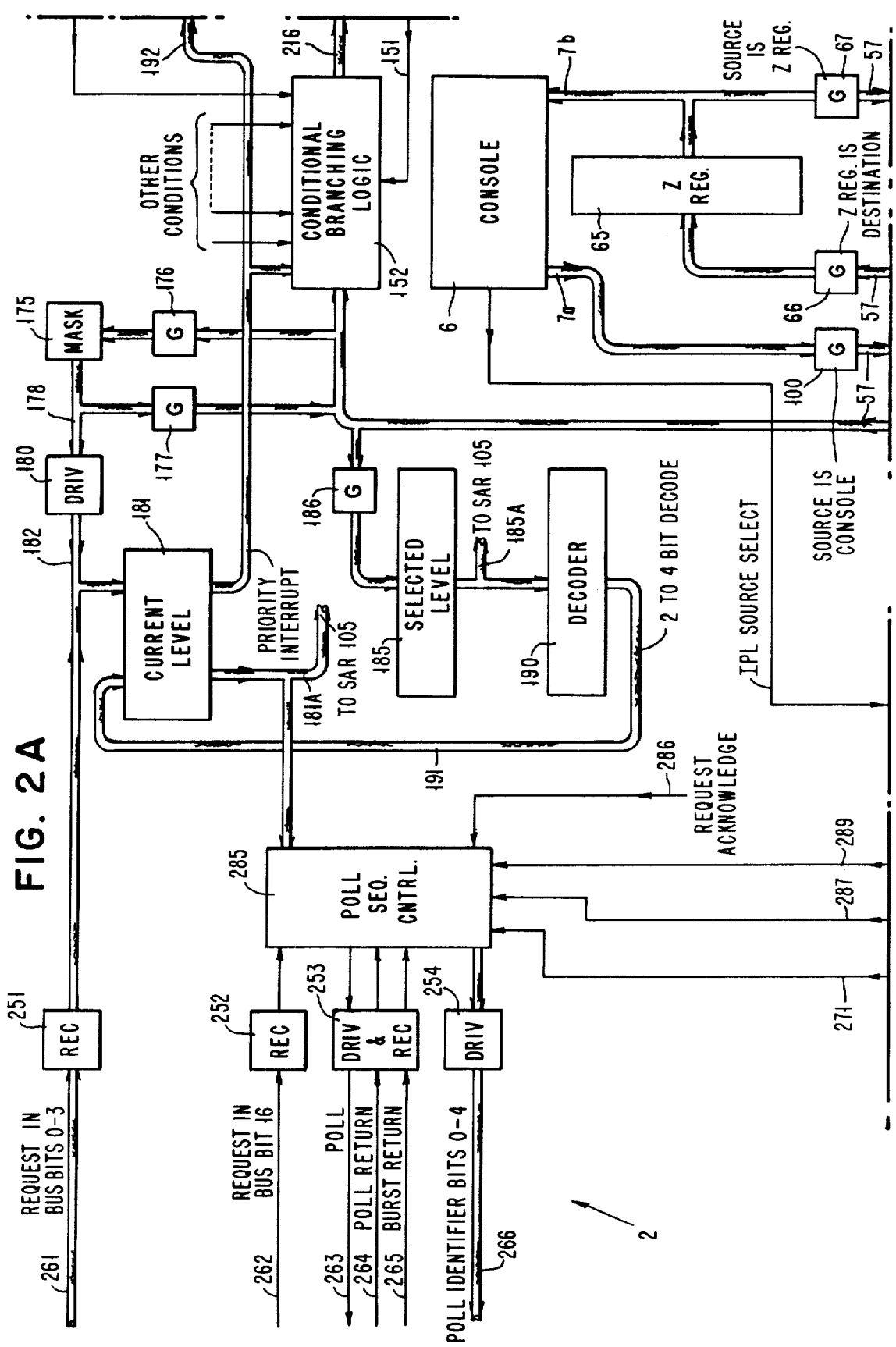

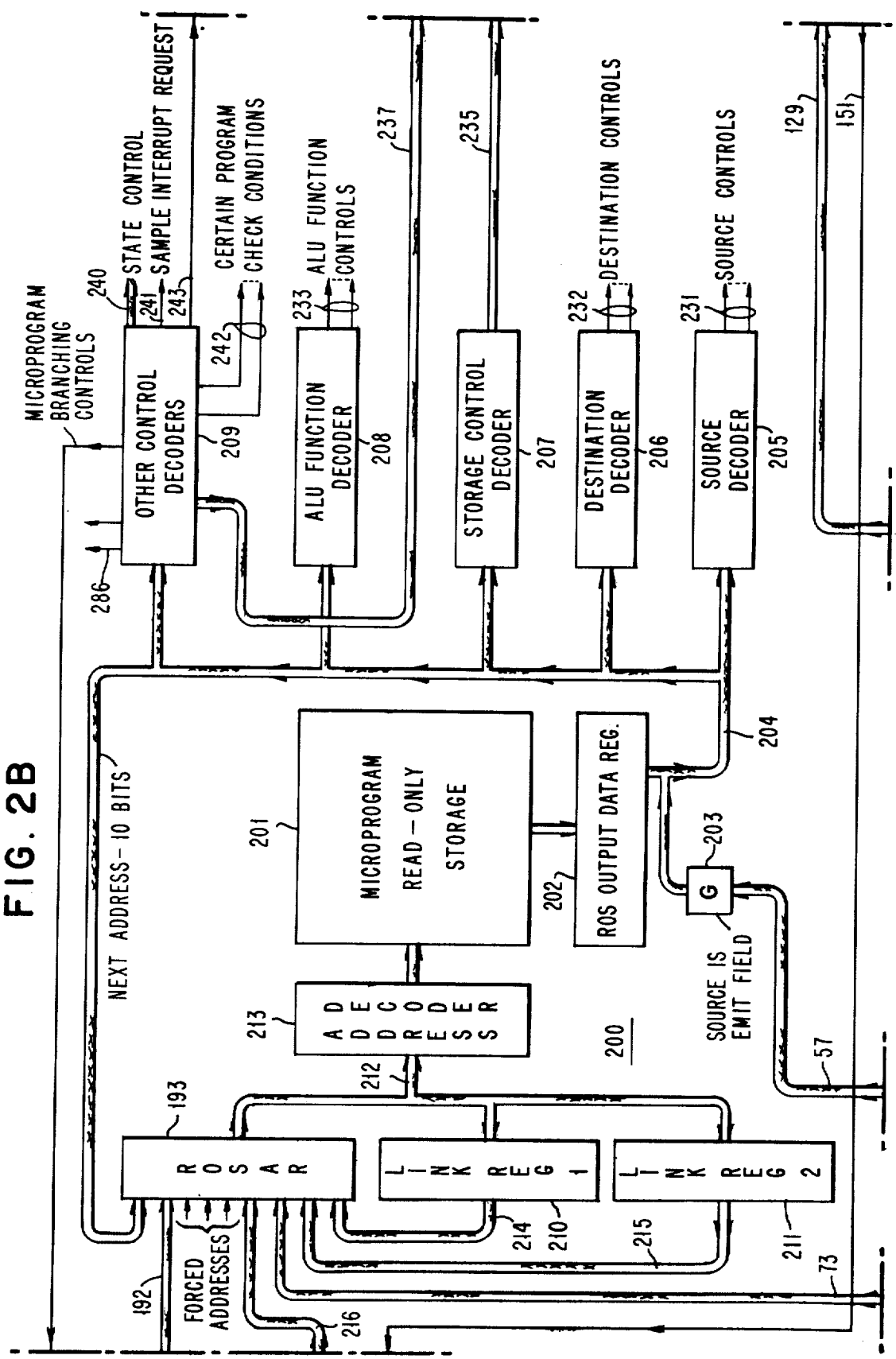

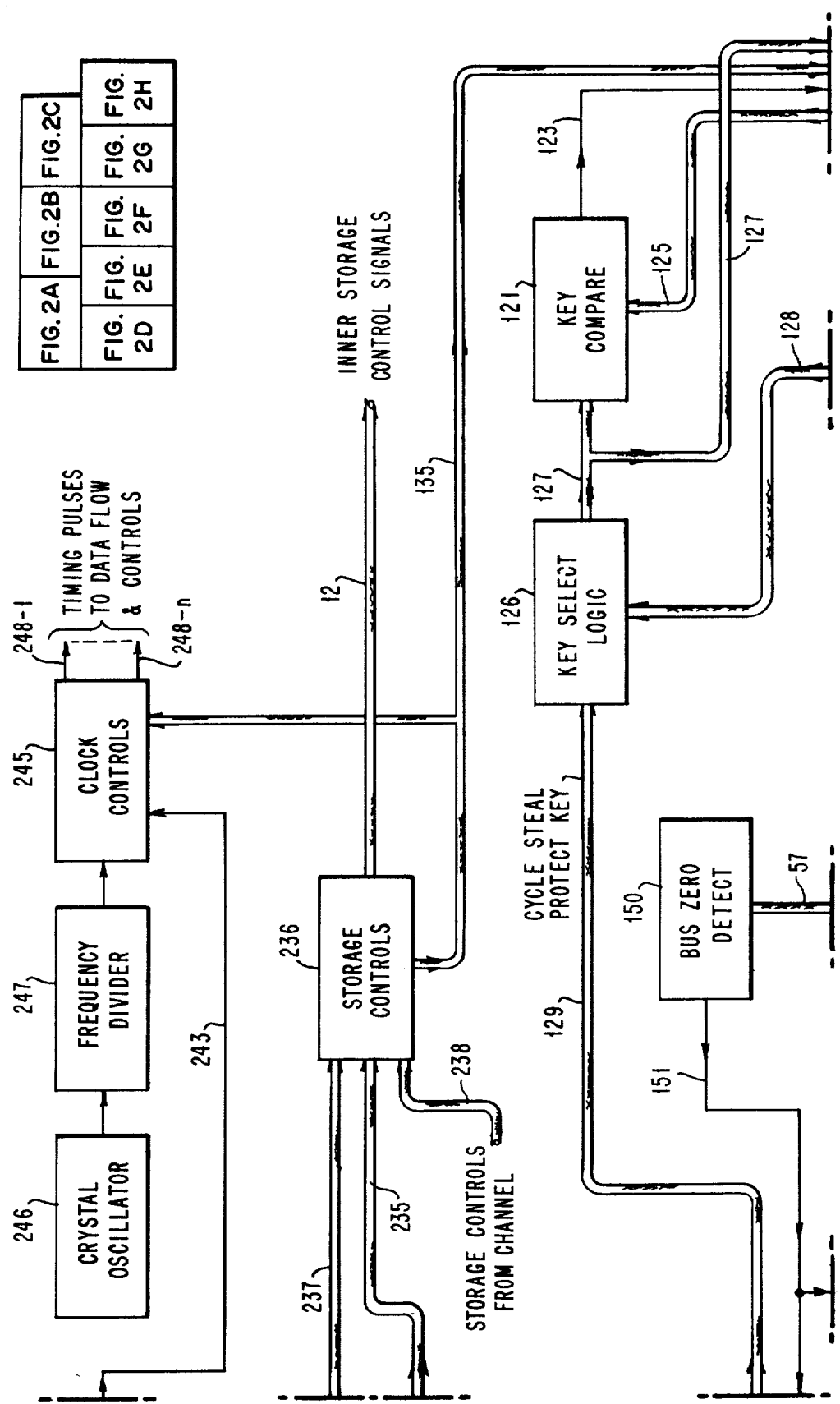

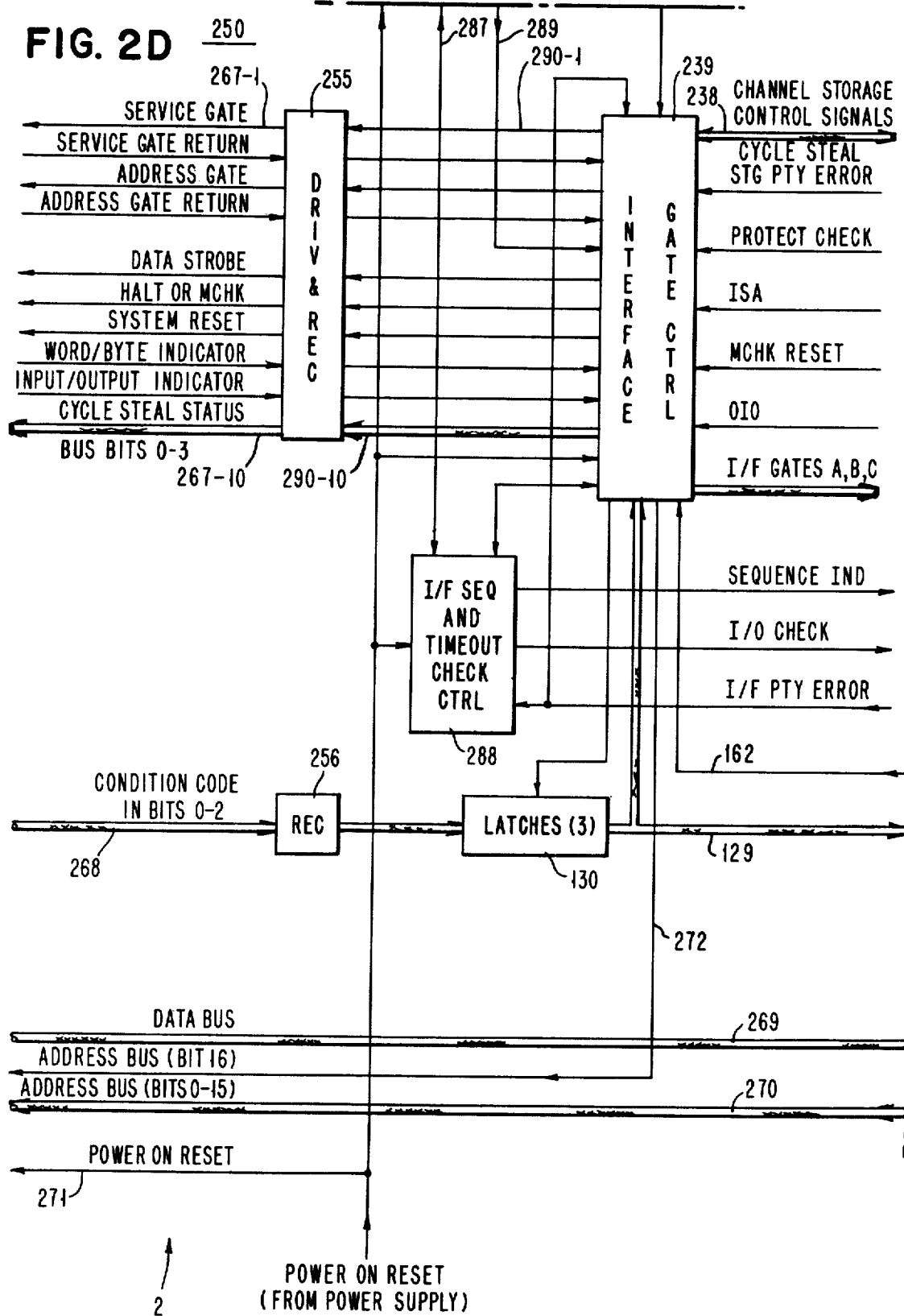

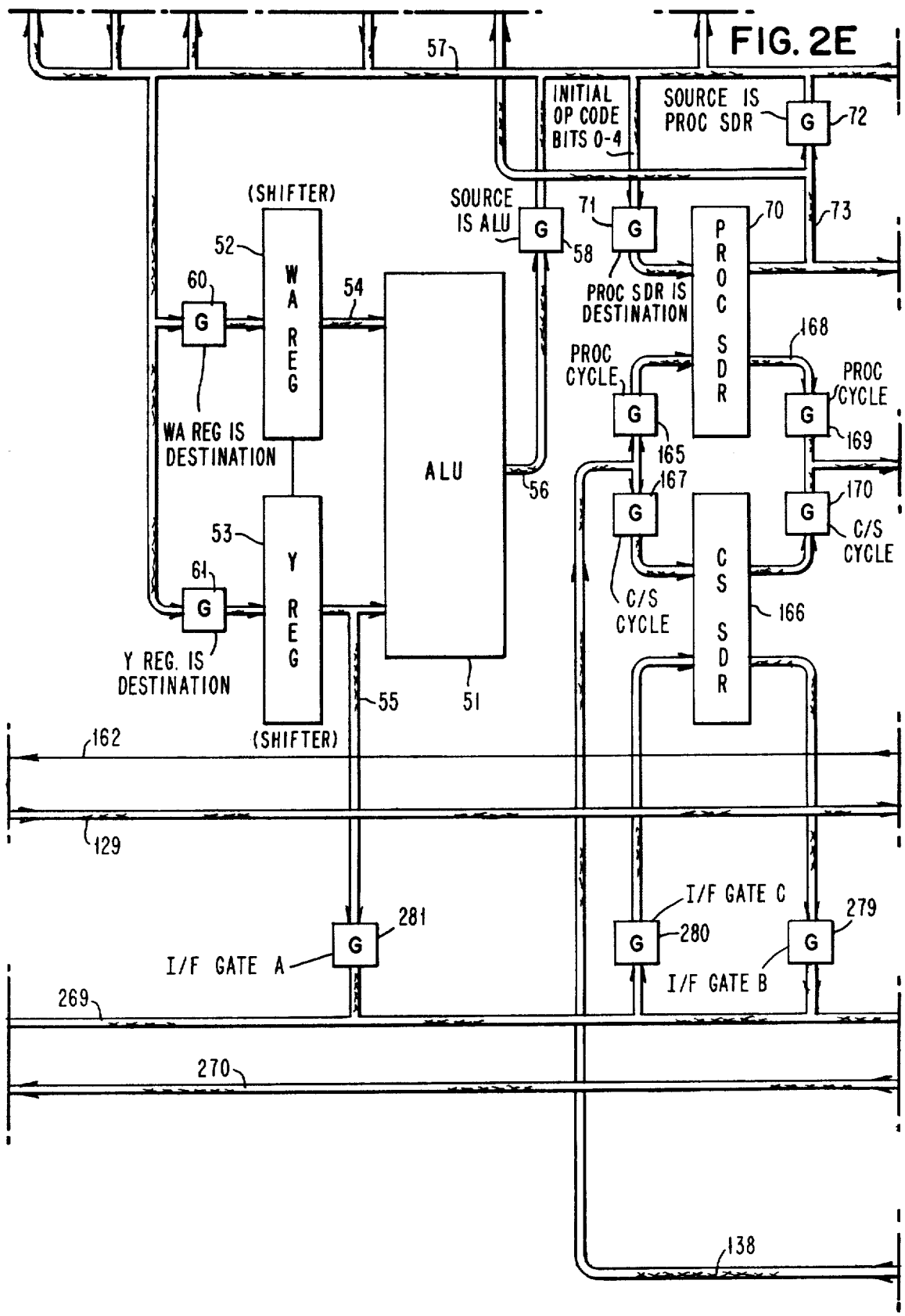

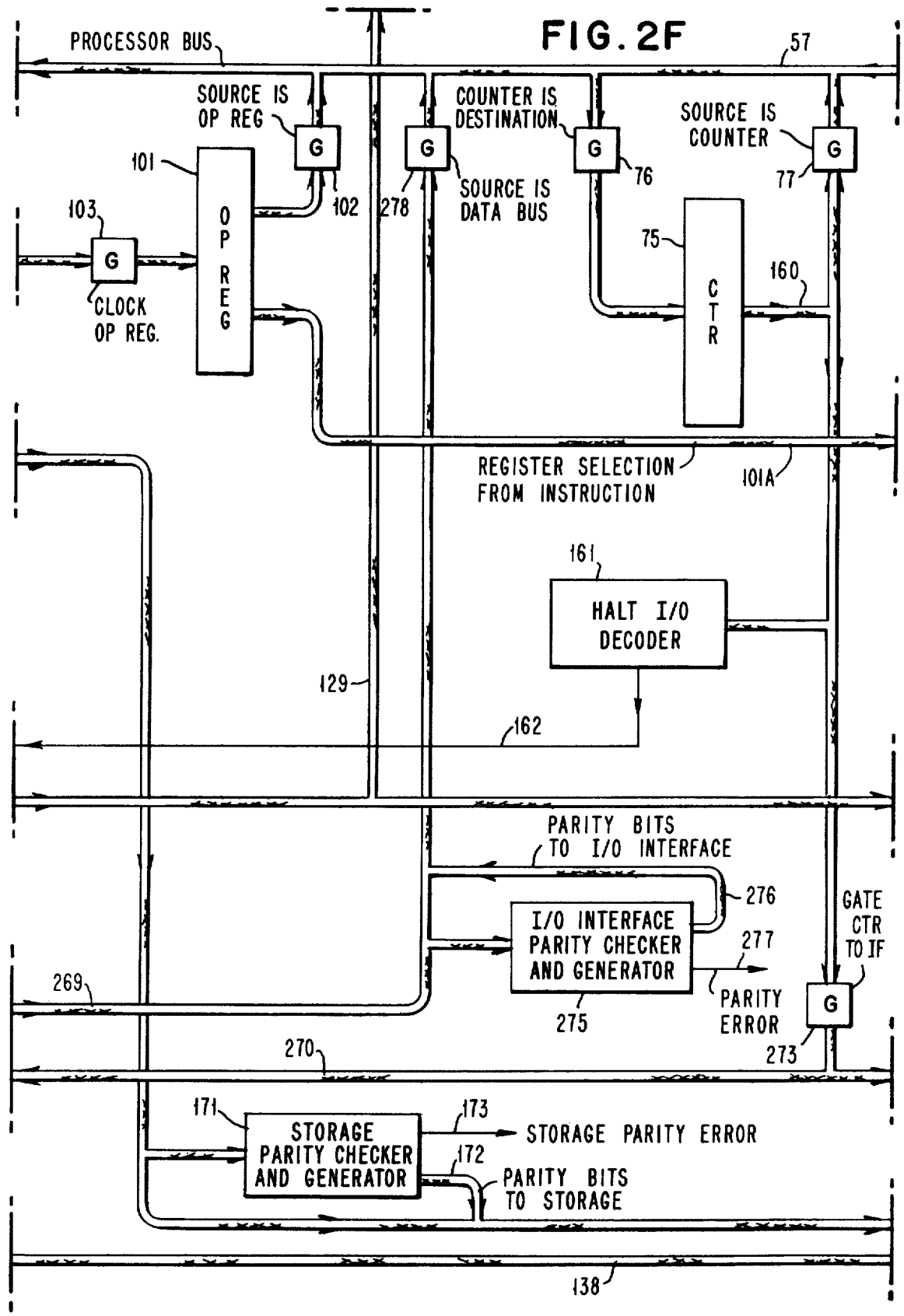

| μ CYCLE NO. | CTL | SOURCE | STG CTL | DEST |
|---|---|---|---|---|
| 1 | C0 | IAR | | WA |
| 2 | | WA+Z | LIW | S&I |
| 3 | | OPD | | Y |
| 4 | | R1 | | WA |
| 5 | CRC0 | WA+Y | | R1 |

ADD IMMEDIATE

ADD IMMEDIATE μCYCLE TIMINGS

INITIAL CONDITIONS: INSTRUCTION IN OP REG
INSTRUCTION ADDRESS IN WA REG
BASE BYTE ADDRESS IN RB
SIGNED BIT DISPLACEMENT IN R7
TARGET REGISTER = R

DATA PROCESSING SYSTEM WITH IMPROVED BIT FIELD HANDLING

INTRODUCTION

This invention relates to the handling of bit fields independently of natural storage addressing elements and boundaries.

A preferred embodiment of the invention is embodied within an electronic data processing system, various aspects of which are described in detail in the following copending patent applications.

Application Ser. No. 681,953, filed Apr. 30, 1976, (now U.S. Pat. No. 4,047,161 issued Sept. 6, 1977) by M. I. Davis, entitled "Task Management Apparatus", and assigned to International Business Machines Corporation describes a data processing system in which the instant invention may be used and said application is incorporated herein by this reference.

Application Ser. No. 682,229, filed on Apr. 30, 1976 (now U.S. Pat. No. 4,038,642 issued July 26, 1977) by M. A. Bouknecht, M. I. Davis and L. P. Vergari, entitled "Input/Output Interface Logic for Concurrent Operations", and assigned to International Business Machines Corporation, describes the preferred form of the controls associated with the present processor, I/O devices, channel and I/O interface for transferring data to and from the I/O devices and said application is incorporated herein by this reference.

Application Ser. No. 681,984, filed on Apr. 30, 1976 (now U.S. Pat. No. 4,037,214 issued July 19, 1977) by R. E. Birney and M. I. Davis, entitled "T Register Controlled Accessing System" and assigned to International Business Machines Corporation, describes the preferred form of the addressing controls associated with the present processor and main storage; and said application is incorporated herein by this reference.

The following other applications, each of which is assigned to International Business Machines Corporation and each of which is incorporated herein by these references, describe various aspects of an exemplary system in which the present invention may be embodied. All of the following applications were filed Apr. 30, 1976.

| Pat. No. and Issue Date | Title | Inventor(s) |
|---|---|---|
| 4,042,913 August 16, 1977 | Address Key Register Load/Store Instruction | R. E. Birney, M. I. Davis, L. A. Graybiel, R. A. Hood, S. Kahn, W. S. Osborne |
| 4,037,215 July 19, 1977 | Key Controlled Address Relocation Translation | R. E. Birney, M. I. Davis, R. A. Hood |
| 4,042,911 August 16, 1977 | Outer and Asynchronous Storage Extension System | D. G. Bourke, F. J. Puttlitz |
| 4,050,060 September 20, 1977 | Equated Operand Address Space Control System | R. E. Birney, R. A. Hood |
| 4,038,645 July 26, 1977 | Non-Translatable Storage Protection Control System | R. E. Birney, M. I. Davis |
| 4,035,779 July 12, 1977 | Supervisor Address Key Control System | R. E. Birney, M. I. Davis, R. A. Hood, T. A. McDermott |
| 4,037,207 July 19, 1977 | System for Controlling Address Keys Under Interrupt Conditions | R. E. Birney, L. A. Graybiel, W. S. Osborne |
| 4,041,462 August 9, 1977 | Data Processing System Featuring Subroutine Linkage Operations Using Hardware Controlled Stacks | M. I. Davis, G. W. Mayes, T. S. McDermott, L. E. Wise |
| 4,038,641 July 26, 1977 | Common Polling Logic for Input/Output Interrupt or Cycle Steal Data Transfer Requests | M. A. Bouknecht, D. G. Bourke, L. P. Vergari |
| 4,053,950 October 11, 1977 | Residual Status Reporting During Chained Cycle Steal Input/Output Operations | D. G. Bourke, L. P. Vergari |
| 4,050,094 September 20, 1977 | Translator Lookahead Controls | D. B. Bourke |

BACKGROUND OF THE INVENTION

In typical data processing systems, as exemplified by the above references, the contents of the main storage are divided into small groups of bits for addressing purposes. These groups (or "elements of addressability") may be, for example, bytes, as in the IBM System/360 or words (of two bytes each) as in the IBM 1130 System. It is important to note that all storage addressing means can only reference information located at the boundary of an element of addressability and that data are fetched or stored from main storage as single or multiple elements of addressability.

Users and programmers of prior art data processing systems must thus operate under considerable difficulty when attempting to deal with main storage operands which are not aligned with the boundaries of elements of addressability or which are not the same size as one element, or some integral number of elements of addressability.

Historically, interrogation (that is, reading) of a general bit field implied loading the word(s) or byte(s) containing the information, and then two shifts (or the equivalent) to isolate and align the field of interest. Emulation and interpretation techniques make heavy usage of such techniques.

The inverse operation (storing a general bit field) historically required such extensive manipulation that data was often not packed (with inherent storage inefficiency) if it would subsequently require random updating.

The prior art described partial solutions to this problem in that it does describe means whereby the leading edge of an unaligned operand may be accessed. However, the prior art handles situations in which the operand does not overlap the boundary of the next element of addressability. This means that all directly accessable unaligned operands must lie totally within a single unit of addressability. It should be evident that, although this lessens the user burden (by reducing the frequency with which a programmer has to recompute addressability) it does not eliminate the problem. The prior art, in contrast to the present invention, does not permit the general accessing of unaligned bit fields of variable length without regard for boundaries of elements of addressability in the system.

This invention overcomes the above difficulty by enabling one to easily handle unaligned bit fields of varying lengths with a single machine instruction. It provides storage optimization for information represented as bit fields of arbitrary length (up to a predetermined maximum length) without concern for byte or word boundaries.

SUMMARY OF THE INVENTION

In accordance with one preferred embodiment of this invention, apparatus is provided for recognizing and executing four new instructions. Three of the instructions are "load" instructions which will cause a particular bit field to be loaded into a specified register from memory. The fourth instruction is a "store" instruction which will cause a bit field that is contained in a specified register to be stored into memory. In the preferred embodiment, each of the instructions contains, in addition to the operation code, (1) a specification of a machine register that is the source or destination of the bit field, (2) a specification of a register which contains a memory byte base address and (3) a specification of the length of the bit field (particularly, in this preferred embodiment, a value that is one less than the actual length of the bit field). The specific bit location in memory of the beginning of the bit field is attained by summing the contents of the byte base address register with the contents of a particular predetermined machine register which specifies the amount by which the bit field is offset from the base address in memory. In the preferred implementation of this apparatus, means are provided for appropriately updating the contents of the displacement register when loading or storing successive variable length bit fields.

GENERAL DESCRIPTION OF THE SYSTEM

Figure 1:
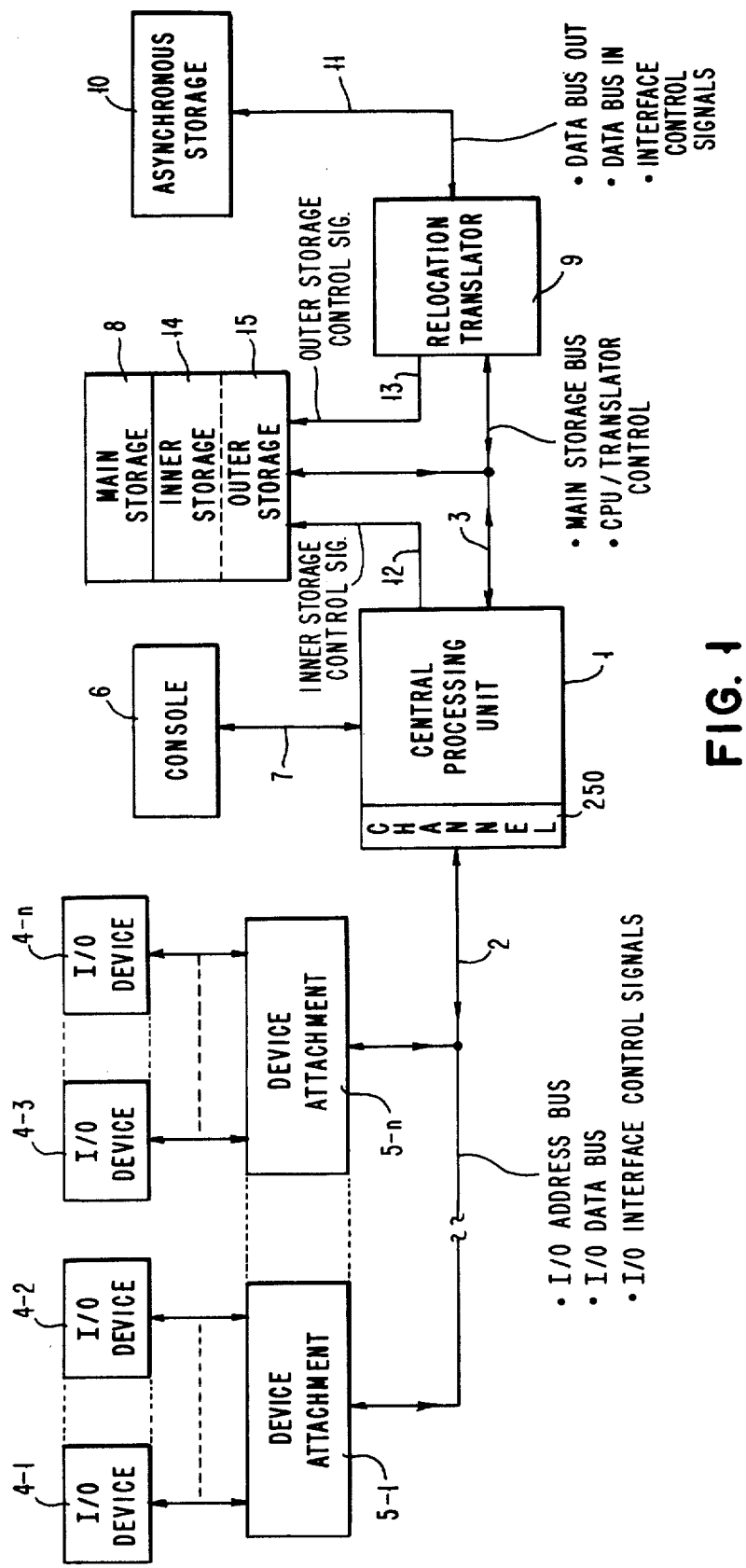
FIG. 1 is a block diagram of a data processing system in which the present improvement may be advantageously incorporated.

FIG. 1 is an overview block diagram of a preferred system within which the present improvement is incorporated.

The central processing unit (CPU), or processor 1, is the primary element of the system and is shown in more detail in FIG. 2A-2H. It executes instructions and controls activity on the two primary interfaces of the system, the input/output (I/O) Interface 2 and the storage/translator interface 3.

A plurality of input/output (I/O) devices 4-1 to 4-n are coupled to the I/O interface 2 by way of respective device attachments 5-1 to 5-n. The device attachments 5-1 to 5-n, together with the CPU 1, control the transfer of data between the CPU 1 and the I/O devices, 4-1 to 4-n.

The storage translator interface 3 couples the CPU 1 to a main storage 8 and to a relocation translator 9. An interface 11 couples the relocation translator 9 to an asynchronous storage 10. The main storage 8 includes an inner storage section 14 and an outer storage section 15. An interface 12 couples the CPU 1 to the main storage 8 for controlling the transfer of data between the CPU and the inner storage 14. An outer storage interface 13 couples the main storage 8 to the relocation translator 9 for controlling the transfer of data between the CPU 1 and the outer storage 15.

An operator console 6 is coupled to the CPU 1 by way of an interface 7.

The interface 2 includes an I/O address bus, an I/O data bus, and I/O interface control signals which will be described in greater detail with respect to FIG. 2. The interface 3 includes a main storage bus and CPU/translator control signal busses. The interfaces 12 and 13, respectively, provide a path for inner storage control signals and outer storage control signals during data transfers. The interface 11 includes a data bus out and a data bus in, together with interface control signal lines. These interfaces are briefly described below.

CPU Data Flow (FIGS. 2A - 2H)

The CPU 1 includes an arithmetic and logic unit (ALU) 51 (FIG. 2E) of conventional construction. A pair of input registers are provided for the ALU 51, i.e. the WA register 52 and the Y register 53, which registers are coupled to the ALU 51 by way of buses 54 and 55, respectively. The ALU 51 includes an output bus 56 which is coupled to the processor bus 57 by way of an AND gate 58. The processor 57 is coupled to the registers 52 and 53 by way of AND gates 60 and 61 to provide input data to the ALU 51.

The processor bus 57 acts as the main data bus for both source and destination data. Therefore, each of the functional components of the processor, which acts as the source, is coupled to the processor bus 57 by way of an AND gate; and each functional component of the CPU 1, which acts as a destination, is coupled to the processor bus by way of a respective AND gate. Most of the functional components of the system act as both a source and a destination for data; and, therefore, are coupled to the processor bus 57 by both source AND gates and destination AND gates.

Thus, the processor bus 57 is coupled to a Z register 65 by way of a destination AND gate 66 and a source gate 67, to a processor storage data register 70 by way of a destination AND gate 71 and a source AND gate 72, to a counter 75 by way of a destination AND gate 76 and source AND gate 77, to a register stack 80 by way of a destination AND gate 81 and a source AND gate 82, to an address key register 85 by way of a destination AND gate 86 and a source AND gate 87 to a hardware level status register 90 by way of a destination AND gate 91 and a source AND gate 92, and to a processor storage address register 95 by way of a destination AND gate 96 and a source AND gate 97.

The processor bus 57 is coupled to the console 6 (FIG. 2A) by way of a source AND gate 100 and interface bus 7a. Data is directed from the processor bus 57 to the console 6 way way of the AND gate 66, the Z register 65, and the interface bus 76. An operation (O) register 101 (FIG. 2F) is coupled to the processor bus 57 by way of a source AND gate 102. Operation codes are stored into the OP Reg. 101 from the processor storage data register 70 by way of an AND gate 103. A stack address register 105 (FIG. 2G) is coupled to the processor bus 57 by way of a destination AND gate 106. A current instruction address register 107 is coupled to the processor bus 57 by way of a source AND gate 109. The input of the register 107 is coupled to the output of the stack registers 80 by way of a bus 108. A storage protect array 110 (FIG. 2H) is coupled to the processor bus 57 by destination and source AND gates 111 and 112.

A program status word (PSW) register 115 has its output 116 coupled to the processor storage bus 57 by a source AND gate 117. Inputs to the register 115 are provided from various system check input lines 120, from a key compare register 121 and from a storage check condition bus 136.

Inputs to the key compare register 121 are provided by the storage protect array register 110 by way of the output bus 125 of array 110 and from a key select logic circuit 126 by way of a bus 127. The output 128 from the register 85 is coupled to one input of the circuit 126. The second input 129 to the circuit 126 is provided by cycle steal protect latches 130 (FIG. 2D). The input bus 129 from the latches 130 is also coupled to the register 90. The output 127 of the key select logic circuit 126 is also coupled to the main storage 8 and relocation translator 9 by way of the output bus 127 which forms a part of the storage/translator interface 3.

The interface 3 also includes a synchronization bus 135 (FIG. 2H), the check condition bus 136, an address bus 137, and input and output buses 138 and 139. The output 140 of the processor storage address register 95 is coupled to the address bus 137 by way of an AND gate 141. The cycle steal storage address register 142 has its output 143 coupled to the address bus 137 by way of an AND gate 144.

Figure 2G:
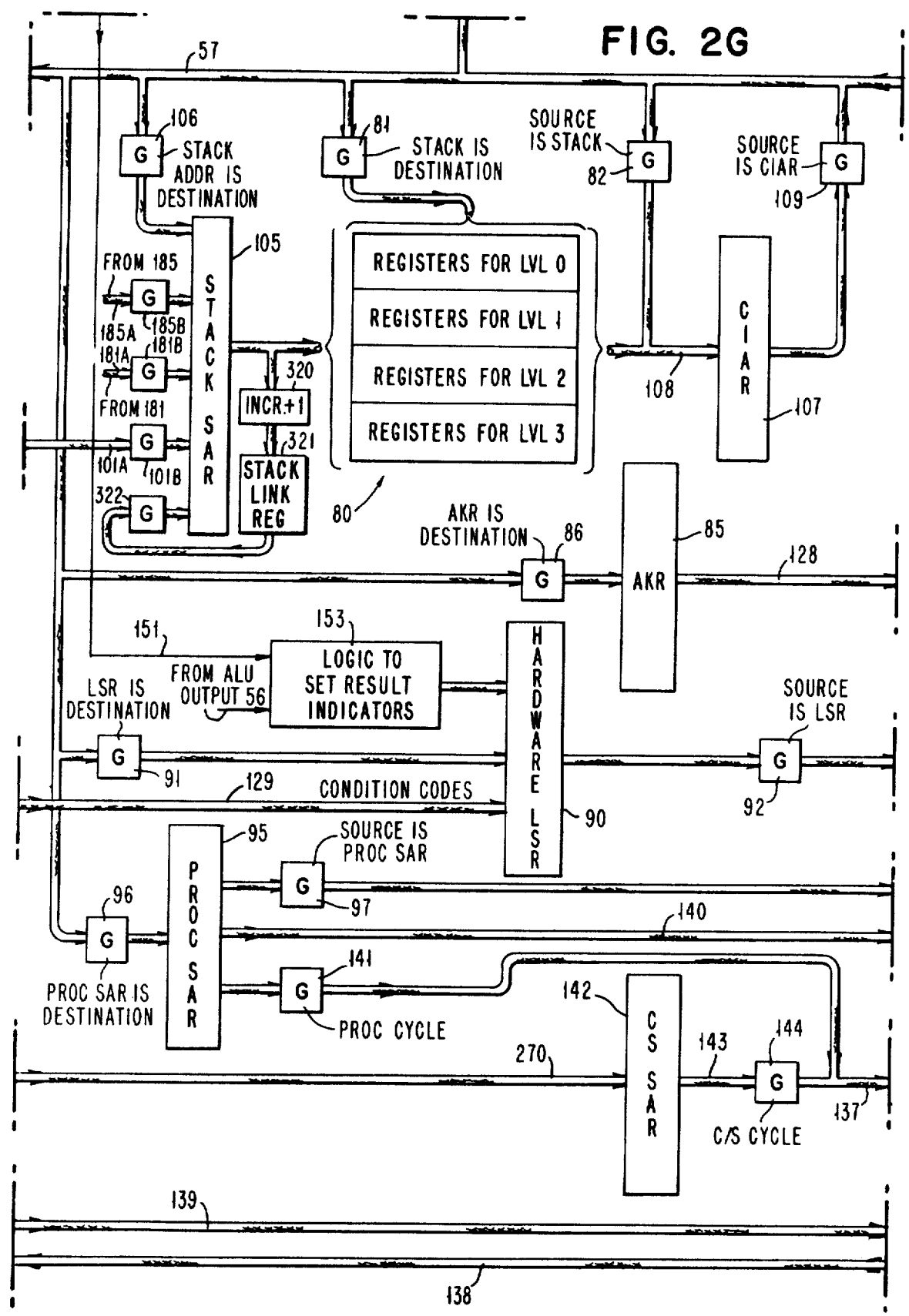
FIG. 2 shows the organization of FIGS. 2A - 2H which latter figures illustrate the major components and data flow of the preferred form of the processor of FIG. 1.
Figure 2H:
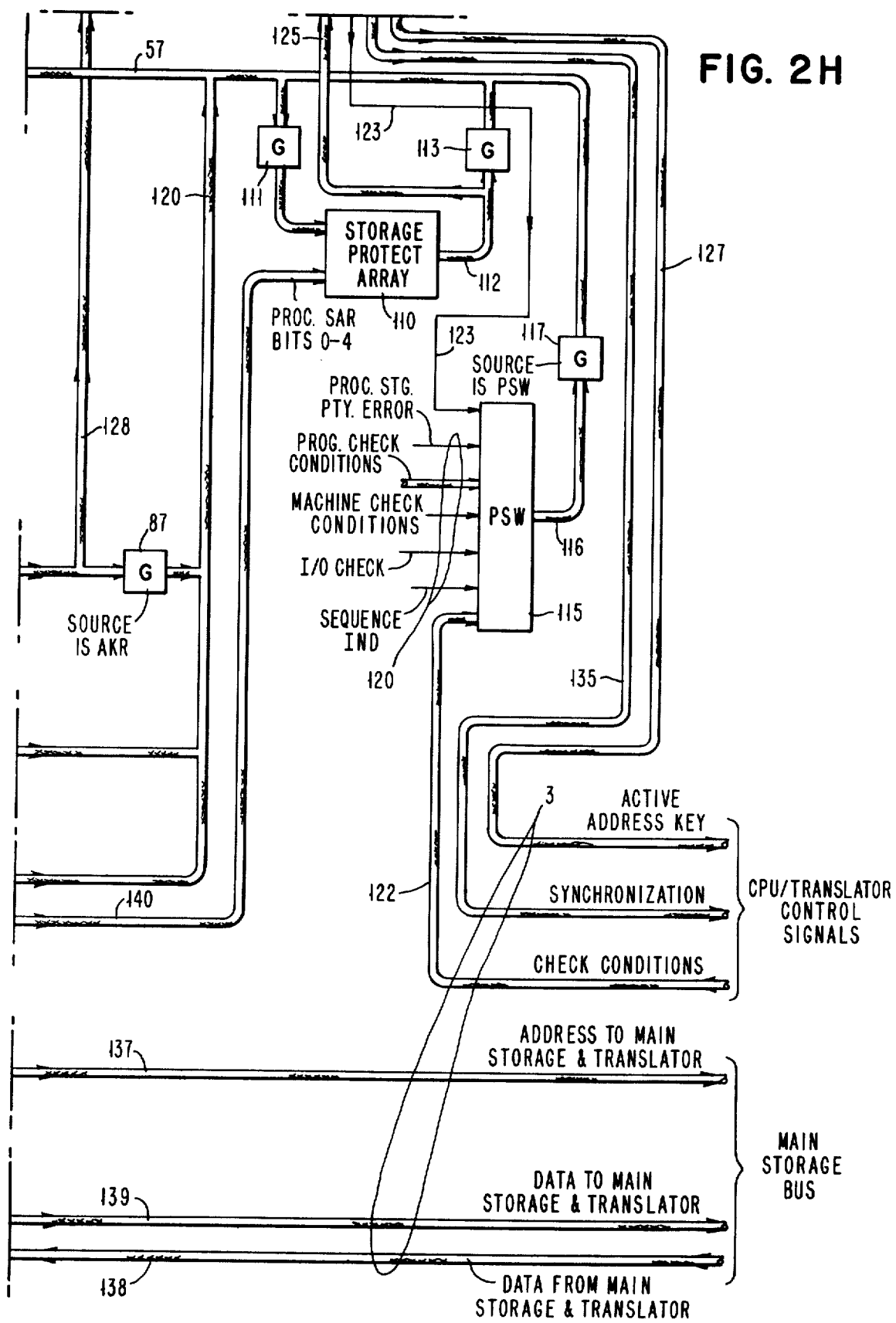

A zero detect circuit 150 (FIG. 2C) has its input coupled to the processor bus 57 and its output 151 coupled to a conditional branching logic circuit 152 (FIG. 2A). The output 151 of the zero detect circuit 150 is also coupled to the input of a result indicator circuit 153 (FIG. 2G). A second input 154 to the result indicator circuit 153 is derived from the output of the ALU 51.

The processor bus 57 also forms an input to the conditional branching logic circuit 152.

The output 160 of the counter 75 (FIG. 2F) provides inputs to a Halt I/O decoder 161 and to the cycle steal storage addresses register 142. The output 162 of the decoder 161 is coupled to an interface gate control circuit 239 (FIG. 2D). The input data bus 138 from main storage is coupled to the processor storage data register 70 (FIG. 2E) by way of an AND gate 165 and to a cycle steal storage data register 166 by way of an AND gate 167. The output 168 from the processor storage data register 70 is coupled to the output data bus 139 to main store by way of an gate 169. The register 166 is coupled to the bus 139 by way of an AND gate 170. The outputs of register 70 and 166 are also coupled to a storage parity check 171 (FIG. 2F). The circuit 171 provides parity bits to the output data bus 139 when no parity error exists and provides an output signal on line 173 when a storage parity error is detected.

A mask register 175 (FIG. 2A) is coupled to the processor bus 57, bits 12, 13, by way of input and output gates 176, 177. The output 178 of the mask register 175 is also coupled to a current level register by way of driver circuits 180 and a bus 182a.

A selected level register 185 is coupled to the processor bus 57, bits 14, 15, by way of an input. An output 185a of register 185 is coupled to the stack SAR 105 (FIG. 2G) by way of a gate 185b. The output 185a is also coupled to the current level register 181 by way of decoder circuits 190 and the output 191 of the decoder circuits 190. The output 192 of the current level register 181 is coupled to the Read Only Storage Address Register (ROSAR) 193 (FIG. 2B) of a microprogram control mechanism 200 of the CPU 1. The output 181a of the register 181 is coupled to the stack SAR 105 by way of gate 181b after being encoded from four to two bits by encoder 181c.

The microprogram control mechanism 200 includes a Read Only Storage (ROS) 201, which is coupled to the processor bus 57 by way of the ROS output data register 202 and source AND gate 203. A second output 204 of the ROS output data register 202 is coupled to a source decoder logic circuit 205, a destination decoder logic circuit 206, a storage control decoder logic circuit 207, an ALU function decoder logic circuit 208, other control decoder logic circuits 209, and the ROSAR 193.

Address selection for the ROS 201 is provided from the ROSAR 193 via bus 212 and an address decoder logic circuit 213. A link register 1 210 and a link register 2 211 have their inputs coupled to ROS 193 via bus 212 and have their outputs 214, 215. The processor storage data register 70 (FIG. 2E) provides another input to ROSAR 193 via bus 73. The conditional branching logic 152 provides an input to ROSAR 193 via bus 216.

The source decoder circuits 205 includes output source control lines 231, which are utilized to control the various source AND gates (such as gate 102) to access source data. The destination decoders 206 include output destination control lines 232, which control various destination AND gates (such as gate 76) to direct destination data to the proper registers or other components. The ALU function decoder circuits 208 include output ALU function control lines 233, which are utilized to control the various functions of the ALU during processor cycles. These destination controls, source controls and ALU function controls will be described in greater detail below, insofar as they are related to the improvement of the present application.

The storage control decoder logic circuits 207 have an output 235 coupled to a storage control circuit 236.

The circuit 236 includes a second input 237 derived from the decoder circuits 209 and a third input 238 from the channel interface gate control circuits 239 (FIG. 2D). This bus 238 is bidirectional and is utilized during data transfers between the I/O devices 4-1 to 4-10 and the CPU 1. The interface bus 12 and the synchronization bus 135 are both coupled to the storage controls logic circuit 236.

The decoder circuits 209 hve a state control output 240, a sample interrupt request output 241, and a check condition output 242. In addition an output 243 from the decoder circuits 209 is coupled to a clock controls circuit 245 (FIG. 2C). A crystal oscillator 246 provides signals to a frequency divider 247 which in turn is coupled to the input of the clock controls circuit 245 to provide the timing pulses for the data flow and controls of the CPU 1. These timing pulses to the CPU data flow and controls are provided by way of output lines 248-1 – 248-N of the clock controls circuit 245. The synchronization bus 135 is coupled to the clock control circuit 245 and is a two-way communications bus for this purpose.

The channel hardware 250 (FIGS. 2A, 2D) will now be described in detail. The channel hardware 250 includes a plurality of driver and receiver circuits 251 to 256, inclusive, which are coupled to the various lines and buses of the I/O interface 2. Thus, the receiver 251 is coupled to a request in bus 261, bits 0–3. The receiver 252 is connected to a request in bus 262, bit 16. A group of receiver and driver circuits 253 are connected to the poll line 263, the poll return line 264 and the burst return line 265. The driver circuit 254 is coupled to the poll identifier bus 266, bits 0-4. The driver and receiver circuits 255 are coupled to lines 267-1 to 267-10, inclusive, which are the service gate line, the service gate return line, address gate line, address gate return line, data strobe line, hold or machine check line, system reset line, word/byte indicator line, input/output indicator line, and cycle steal status bus, bits 0–3, respectively. The receivers 256 are connected to a condition code input bus 268, bits 0-2. The interface 2 also includes a data bus 269, an address bus 270, bits 0–15, an address bus bit 16 line 272 and a power on reset line 271.

The data bus 269 is coupled to the input of an I/O interface parity checker and generator circuit 275. The circuit 275 includes a first output 276 which provides parity bits to the I/O interface data bus 269 when no error exists in data transmitted from an I/O device into the CPU 1. The circuit 275 includes a second output 277 which provides a signal when a parity error occurs on the data bus 269. The data bus 269 is also coupled to the processor bus 57 by way of a source AND gate 278. The data bus 269 is coupled to the input of the cycle steal storage data register 166 by way of an AND gate 280 and is coupled to the output of the cycle steal storage data register 166 by way of an AND gate 279. The data bus 269 is coupled to the output 55 of the Y register 53 by way of an AND gate 281.

The address bus 270 is coupled to the input of the cycle steal storage address register 142. The address bus 270 is also coupled to the output 160 of the counter 75 by way of a gate 273.

The output 182b of receiver circuits 251 is coupled to an input of the current level register 181 via AND gate 187c, the other input of which is the mask driver output 182a. The driver and receiver circuits 252, 253, 254 are coupled to a poll sequence control circuit 285. The current level register 181 provides another input to the circuit 285 via output 181a. A request acknowledge line 286 provides a further input to the poll sequence control circuit 285. The poll sequence control circuit 285 is also coupled to the interface control circuit 239 by way of a line 289. An interface sequence ad timeout check control circuit 288 is coupled to the poll sequence control circuit 285 by way of a line 287. The power on reset line 271 provides an additional input to the circuit 285.

Lines 290-1 to 290-10 couple the driver and receiver circuits 255 to the interface gate control circuit 239.

The processor bus 57 is a 16 bit wide bus for conveying information between source and destination elements in the CPU data flow as selected by the microprogram controls.

The operation register (OP REG) 101 is a 16 bit register which contains the first word of the instruction, including register address arguments for the register stack 80, during instruction decode. It is also used as a temporary data register when not holding the first word of the instruction. Its output is a source element to the processor bus 57. It receives its input from the storage data register 70.

The ALU 51 is a 16 bit element which performs arithmetic and logical functions as specified by the instructions. Its output 56 is a source element to the processor bus 57. It receives its input from the WA and the Y registers 52, 53.

The WA register 52 is a 16 bit register which is the primary input to the ALU 51 for arithmetic and logic operations. It receives input as a destination element from the processor bus 57.

The Y register 53 is a 16 bit register which is the secondary input to the ALU 51 for arithmetic and logic operations. In conjunction with the WA register 52, it performs shifting on double word shift operations. It receives input as a destination element from the processor bus 57. This register 53 also provides the data path for outbound data to the I/O data bus 269 for direct program control I/O operations.

The processor storage data register (PROC SDR) 70 is a 16 bit register through which all data to or from main storage, except cycle stealing data, is gated. The first word of every instruction that is fetched from main storage 8 is gated through the PROC SDR register 70 to the OP register 101. This register 70 is also used as a temporary data register during other processor operations. Therefore, it can receive input as a destination element from the processor bus 57 and outputs as a source element to the processor bus 57.

The cycle steal storage data register (CS SDR) 166 is a 16 bit register through which all data is gated to and from main storage 8 via the I/O data bus 269 and either the in or out storage bus 138 or 139 during cycle steal operations.

The low order 8 bits of the 16 bit counter (CTR) 75 are used as a counter for keeping track of various processor operations. It is also used as a temporary register for other processor operations. Therefore, it is a source and destination element for the processor bus 57. It is also used to hold the device address for device selection and the I/O command is gated via gate 273 to the I/O address bus 270 during direct program control operations.

The processor storage address register (PROC SAR) 95 is a 16 bit register used primarily to hold a main storage address. Its contents are gated via gate 141 to the storage address bus 137 for storage accesses during normal processing and direct program control operations. It is also used as a temporary data register when not needed for addressing main storage.

The cycle steal storage address register (CS SAR) 142 is a 16 bit register used to hold a main storage address transferred via the I/O address bus 270 from the I/O device during cycle steal data transfer operations. It is gated via gate 144 to the storage address bus 137 for cycle steal storage accesses only.

The primary purpose of the 16 bit Z register 65 is to hold the data for the operator data display indicators (not shown) of the console 6. It is also used as a temporary register for other processor operations. It is a source and destination element for the processor bus 57.

Figures 3, 4:
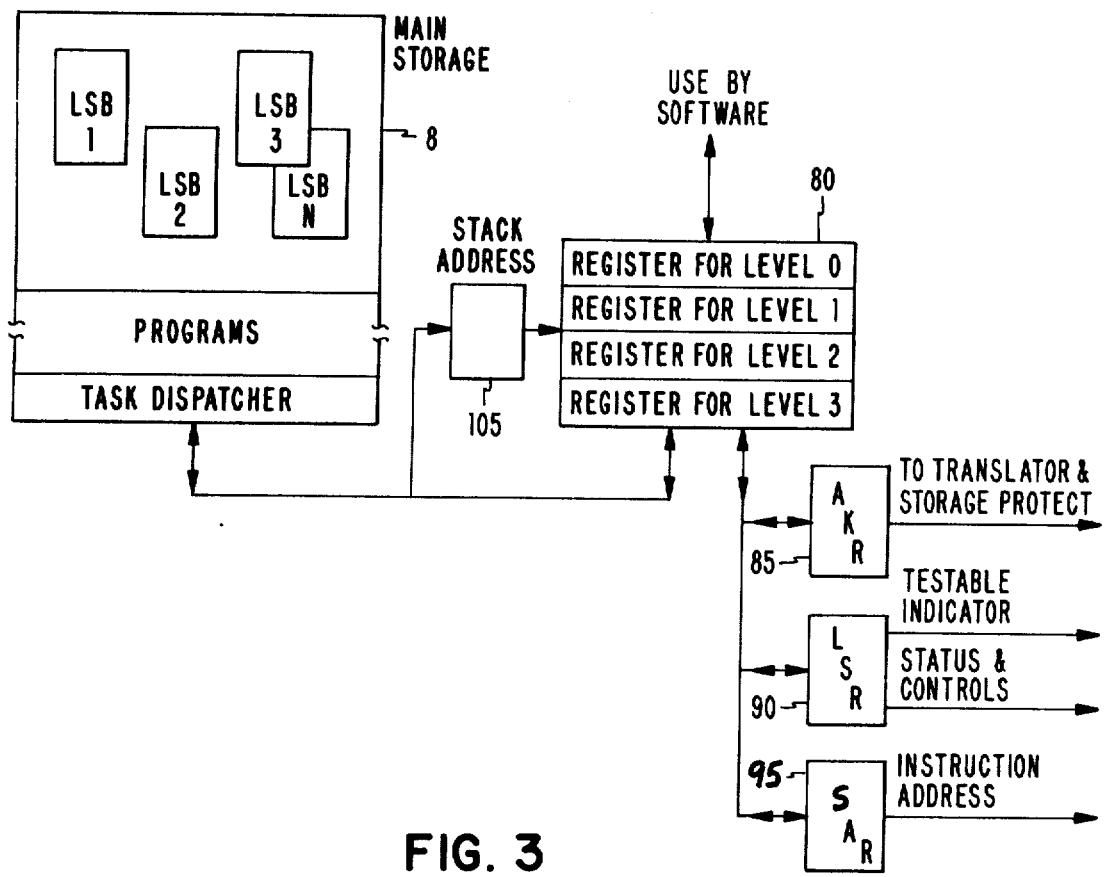
FIG. 3 is a diagrammatic illustration of the primary components of the processor task management system.
FIG. 4 is a map of the preferred form of the stack registers.
Figure 5:
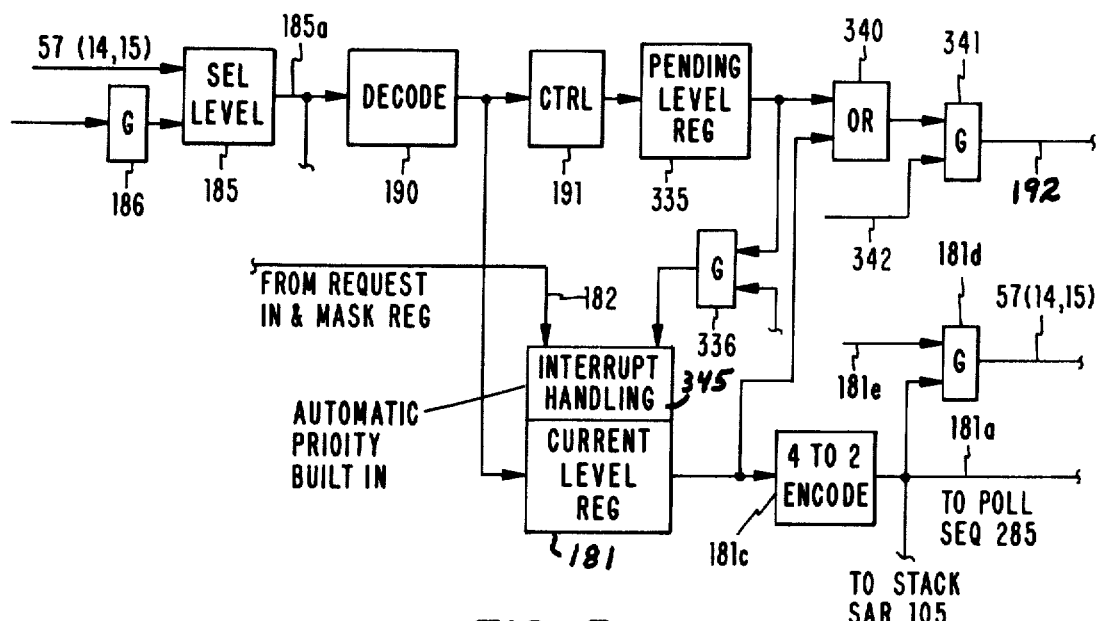
FIG. 5 is a schematic diagram showing the interconnection of various level registers and an interrupt mechanism utilized in the processor.
Figure 15:
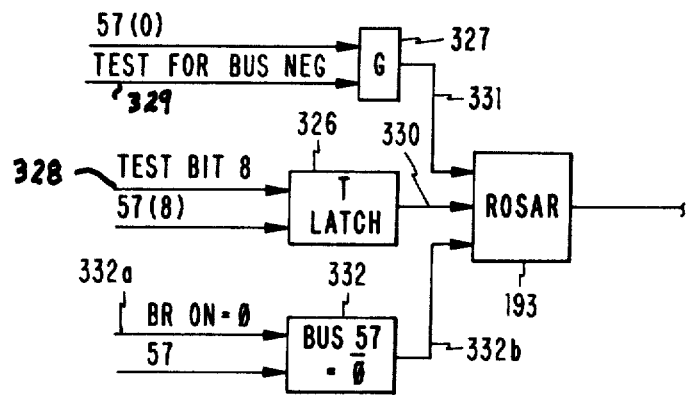
FIG. 15 illustrates certain of the conditional branching logic which is utilized in the preferred embodiment of the present improvement.

The register array (stack) 80 (FIG. 3) is an array of monolithic latches used to hold the registers, level status, address keys and instruction address for each of the four interrupt levels. It also contains certain working registers used by the microprogram, i.e., the TEMP, TEMP1-3, DBUF, SOA1, SOA2, current level save and AKR save, organized as shown in FIG. 3.

The TEMP and TEMP1-3 registers contain temporary data used by the microprogram during normal processing. SOA1 contains the manually entered address to be used for stop-on-address operations and SOA2 contains the console storage key in the low three bits, the remaining bits are zero. The DBUF register is the console data buffer. The contents of this buffer drives the data display indicators (not shown) on the console 6. The current level register contains the level that was active when stop state was entered. The AKR save register contains a copy of the current level AKR. The data in the LSR, AKR and IAR registers of the stack 80 for the current level are also held in the corresponding hardware registers 90, 85, 107 for performance reasons, i.e., to reduce the number of stack accesses. The stack 80 of the preferred embodiment is comprised of two 64×9 arrays connected in parallel to form a 64×18 array.

The stack address register 105 is a 6 bit register for addressing the stack 80. Inputs to register 105 are provided from an incrementer 320 via a stack link register 321 and a destination gate 322, the selected level register 185 via bus 185a and gate 185b, the current level register 181 via bus 181a and gate 181b, from the OP register 101, via bus 101a and gate 101b, and the processor bus 57. The stack address register 105 is loaded from the processor bus 57 via gate 106.

The hardware level status register (LSR) 90 is a 16 bit hardware register used to hold the current level status. During processing on a specific level, the contents of the hardware register LSR 90 change as the result or arithmetic and logical operations. The current level LSR in the register stack 80 remains unchanged until a level exit occurs. At this time, the hardward LSR register 90 contents are placed into the LSR register in the register stack 80 of the level being exited; and the new level status from the register stack 80 is placed into the hardware LSR register 90.

Certain of the contents of the LSR register 90 are as follows:

TABLE 1

| Level Status Register | | |
|---|---|---|
| Bit | Meaning | |
| 0 | Even Indicator | |
| 1 | Carry Indicator | |
| 2 | Overflow Indicator | Result Indicators |
| 3 | Negative Result Indicator | |
| 4 | Zero Result Indicator | |

TABLE 1-continued

| Level Status Register | | |
|---|---|---|
| Bit | Meaning | |
| 8 | Supervisor State | |
| 9 | In Process | State Controls |
| 10 | Trace | |
| 11 | Summary Mask | |

The result indicators are used by software for decision making.

The even, carry, and overflow indicators are also used by I/O operations to hold the condition codes sent to the processor 1 by the I/O devices 4-1 to 4-n.

During an I/O instruction execution the even, carry and overflow indicators are assigned the following condition code values:

TABLE 2

| Condition Code | Even | Carry | Overflow | Meaning |
|---|---|---|---|---|
| 0 | 0 | 0 | 0 | Device Not Attached |
| 1 | 0 | 0 | 1 | Busy |
| 2 | 0 | 1 | 0 | Busy After Reset |
| 3 | 0 | 1 | 1 | Command Reject |
| 4 | 1 | 0 | 0 | Intervention Required |
| 5 | 1 | 0 | 1 | Interface Data Check |
| 6 | 1 | 1 | 0 | Controller Busy |
| 7 | 1 | 1 | 1 | Satisfactory |

During interrupt acceptance all condition codes are reported by the device. The even, carry and overflow indicators are assigned the following condition code values:

TABLE 3

| Condition Code | Even | Carry | Overflow | Meaning |
|---|---|---|---|---|
| 0 | 0 | 0 | 0 | Controller End |
| 1 | 0 | 0 | 1 | PCI |
| 2 | 0 | 1 | 0 | Exception |
| 3 | 0 | 1 | 1 | Device End |
| | 1 | 0 | 0 | Attention |
| 5 | 1 | 0 | 1 | Attention and PCI |
| 6 | 1 | 1 | 0 | Attention and Exception |
| 7 | 1 | 1 | 1 | Attention and Device End | where PCI is a program controlled interrupt.

TABLE 4

| Level Status Register Bit Definitions | | |
|---|---|---|
| Bit | | |
| 0 | Even Indicator | Set to one if the low order bit of the result is zero; otherwise set to zero. |
| 1 | Carry Indicator | Set to one if the result of add or subtract operations cannot be represented as an unsigned number; otherwise set to zero. |
| 2 | Overflow Indicator | Set to one if the result of an arithmetic operation cannot be represented as a signed number; otherwise set to zero; |
| 3 | Negative Indicator | Set to one if bit 0 of the result is one; otherwise set to zero. |
| 4 | Zero Indicator | Set to one if the result is all zeros; otherwise set to zero. |
| 8 | Supervisor State | Set to one whenever the processor 1 enters supervisor state. Supervisor state is entered when:<br>- A supervisor call instruction is executed.<br>- A class interrupt occurs.<br>- An I/O interrupt is accepted. |
| 9 | In Process | This bit is set or reset by the corresponding bit in the LSR of the storage level status block (LSB) whenever the load level status block (LLSB) instruction is executed. The LLSB loads an LSB from storage 8 into |

TABLE 4-continued

| | Level Status Register Bit Definitions |
|---|---|
| | the designated level LSB in the stack 80. |
| 10 Trace | This bit is set or reset by the corresponding bit in the LSR register of the storage LSB whenever the local level status block instruction is executed. The LLSB loads an LSB from storage 8 into the designated level LSB in the stack 80. |
| 11 Summary Mask | When the summary mask = 0, all priority interrupts on all levels are disabled. When the summary mask = 1, all priority interrupts on all levels are enabled. The summary mask is set to one (enabled) by the following:<br>- Execution of the enable instruction with bit 15 = 1.<br>- System Reset, Power-On Reset, IPL.<br>- Execution of an LLSB instruction with bit 11 of the storage LSR = 1.<br>- Acceptance of a priority interrupt on the interrupted to level.<br>The summary mask is set to zero (disabled) by the following:<br>- Execution of the supervisor call (SVC) instruction.<br>- Execution of the disable instruction with bit 15 = 1.<br>- Any class interrupt:<br>   Machine Check<br>   Program Check<br>   Soft Exception Trap<br>   Power Thermal Warning<br>   Supervisor Call<br>   Trace<br>   Console<br>- Execution of the LLSB instruction with bit 11 of the storage LSR = 0. |

The processor 1 does not regard numbers as either signed or unsigned, but performs the designated operation on the values presented. All indicators reflect the result of the operation. This allows the programmer to test results for the type of operation performed.

The processor status word (PSW) register 115 is a 16 bit register which contains error and exception information that causes a program check, machine check, soft exception trap, or power thermal warning class interrupt to occur. Three status flags are also contained in the PSW register 115. The PSW register 115 is set by hardware and microprogram-detected conditions.

TABLE 5

| | Processor Status Word | |
|---|---|---|
| | Bit | Meaning |
| Program check | 0 | Specification Check |
| | 1 | Invalid Storage Address |
| | 2 | Privilege Violate |
| | 3 | Protect Check |
| | 4 | Invalid Function (either program check or soft exception) |
| | 5 | Floating Point Exception |
| Soft Exception Trap | 6 | Stack Exception |
| | 7 | Reserved |
| | 8 | Storage Parity Check |
| Machine Check | 9 | Reserved |
| | 10 | CPU Control Check |
| | 11 | I/O Check |
| | 12 | Sequence Indicator |
| Status Flags | 13 | Auto IPL |
| | 4 | Translator Enabled |
| Power/Thermal | 15 | Power/Thermal Warning |

The address key register (AKR) 85 (FIG. 2G) is a 16 bit hardware register used to contain the contents of the current level AKR during processing on that particular level. The AKR register 85 provides the address key which is compared in circuit 121 against the protect key in the storage protect array 110. This is done for each storage access except for cycle steal operations. The instruction space key (ISK) field of the AKR is also used as the console address key for any manual storage accesses from the console 6.

TABLE 6

| | Address Key Register |
|---|---|
| Bit | Meaning |
| 0 | Equate Operand Spaces |
| 5 | Operand 1 Key bit 0 |
| 6 | Operand 1 Key bit 1 |
| 7 | Operand 1 Key bit 2 |
| 9 | Operand 2 Key bit 0 |
| 10 | Operand 2 Key bit 1 |
| 11 | Operand 2 Key bit 2 |
| 13 | Instruction Space Key bit 0 |
| 14 | Instruction Space Key bit 1 |
| 15 | Instruction Space Key bit 2 |

The current instruction address register (CIAR) 107 (FIG. 2G) contains the address of the instruction being executed. The CIAR register 107 is loaded at the beginning of each instruction. During the execution of the instruction, the level IAR in stack 80 is updated to the next instruction address. Should a class interrupt stop the current instruction from being fully executed, the class interrupt is handled, then the CIAR register 107 is used to readdress the interrupted instruction which is executed again.

The storage protect array 110 (FIG. 2G) consists of the thirty-two storage key registers (not shown). The array is enabled whenever the storage protect feature is installed and enabled. Each register contains the protect key and the read only bit for controlling a two thousand 48 byte block of storage 8. The set storge key instruction sets the key and read only bit into a specific storage key register. The copy storge key instruction reads out a specific storage key register.

The current level register 185 (FIG. 2A) consists of a 2 bit register which is used to hold the current level indicator that is presently in effect. The register 185 is set whenever the level is changed. The register 185 is used in addressing the proper level status block in the local storage stack 80 and is also used to determine if an interrupt may be accepted. For this latter purpose, a two to four bit level decoder 190 is used. The register 185 is a source and destination element for the processor bus 57.

The mask register 175 (FIG. 2A) is a four bit register which is used to enable to disable priority interruptions on the four interrupt levels, as follows:

TABLE 8

| Bit 0 = 0 Level 0 | Interruptions disabled |
|---|---|
| Bit 1 = 0 Level 1 | Interruptions disabled |
| Bit 2 = 0 Level 2 | Interruptions disabled |
| Bit 3 = 0 Level 3 | Interruptions disabled |
| Bit 0 = 1 Level 0 | Interruptions enabled |
| Bit 1 = 1 Level 1 | Interruptions enabled |
| Bit 2 = 1 Level 2 | Interruptions enabled |
| Bit 3 = 1 Level 3 | Interruptions enabled |

The mask register 175 is set by the load mask instruction. It is a source and destination element for the processor bus 57.

The mask register outputs 178 are also connected to the mask unloaded drivers 180 which permits the ANDing of the four bits of mask register 175 with the appropriate priority interrupt request bits from the I/O interface receivers 251 and bus 261 for use in establishing interrupt acceptance action.

Figure 8:
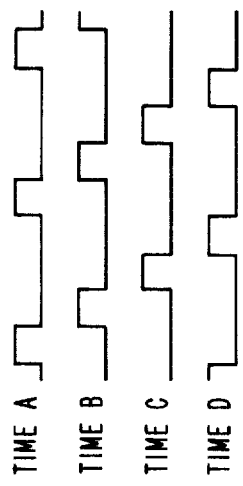
FIG. 8 shows the basic timing signals for the microprogram execution.

A crystal oscillator 246 generates the basic clock frequency for the CPU 1. A frequency divider 247 generates the free-running clock pulses A, B, C and D as shown in FIG. 8. The up level indicates logical 1. Each pulse is active for 55 nanoseconds once every 220 nanoseconds.

The clock controls 245 control the stopping and starting of the gate clock pulses, distribute the clock pulses to the data flow and controls, and generate certain special clock pulses, for main storage timing. The gated clock pulses are of the same form as the A, B, C and D pulses described above, but may be stopped and started by conditions arising in the microprogram as hardware.

The Bus Zero Detect logic 150 is a group of combinatorial logic elements which are capable of determining whether the value on the processor bus is zero. Its output is used by the microprogram in decision-making.

The parity generator and checker circuit 171 checks for odd parity on all bytes received from main storage 8 by the CPU 1. It generates parity on all bytes sent to main storage 8 by the CPU 1. Detection of a processor cycle storage parity error sets the storage parity bit in the PSW register 115 and causes a machine check class interrupt. Detection of a cycle steal cycle storage parity error causes the error condition to be signalled to the active I/O device.

The I/O Interface Parity Generator and Checker 275 checks for odd parity in all bytes received over the I/O interface data bus 2. It generates odd parity on all bytes transmitted over the I/O interface data bus 2. Detection of a parity error on inbound data causes the error condition to be signalled to the active I/O device.

The Halt I/O decoder 161 decodes the Halt I/O command which is executed by the channel 250 rather than by an I/O device. It causes a reset of all I/O devies 4-1 to 4-n attached to the system.

The key selection logic 128 is used to select one of the three AKR keys in register 85 or the cycle steal key via bus 129 for main storage reference. During cycle steals, the I/O cycle steal key is transmitted to the CPU 1 on the Condition Code In Bus 268 of the I/O interface 2. The output 127 of this logic 128 is sent to the translator 9 and to the key compare logic 121.

The key compare logic 121 is used to compare the selected key with the storage protect key from the storage protect array 110. A violation causes the protect check bit in the PSW to be set and an interrupt occurs.

The poll sequence control 285 skews and generates the poll tag on line 213 and poll identifier on bus 266, provides signalling to the interface gate controls 239 for service gate operation, and is the interface device and line out controls 288 for error checking. The poll sequence is to resolve contention between multiple requesting devices for the same CPU resource.

The interface auto control 239 skews and generates the address and service gates for the interface, and provides contention resolution between same, registers cycle steal storage access errors for presentation to the device, provides line signalling to and from the storage controls, and deskews the interface buses and controls the condition code in latches 130.

The interface sequence and time out controls 288 provides the time out controls for sequence error checking on the interface 2, detects invalid combinations of interface tags and reports detection of machine check conditions on the interface to the processor 1.

The I/O interface 2 connects the CPU channel 250 to device attachments 5-1 to 5-n. It consists of the elements described below.

The I/O data bus 269 is a bidirectional bus of 16 data and two parity lines. It is used to transfer data to and from the I/0 devices 4-1 to 4-n during direct program control operations and cycle stealing operations, and to transfer device address and interrupt status byte to the CPU 1 during interrupt acceptance.

The I/O address bus 270 is a bidirectional bus of 16 lines used to pass each device address for device selection and I/O commands to I/O devices 4-1 to 4-n during direct program controlled operations. It is also used to transfer main storage addresses from the active I/O device to the CPU 1 during cycle steal operation.

The I/O interface control signals on lines 267-1 to 267-10 are a group of signals used to pass condition codes to the CPU 1, to post status to I/O devices 4-1 to 4-n, to select and control IPO operations, to transfer interrupt and cycle steal requests to the CPU 1, to poll and control acceptance sequences for interrupt and cycle steal, to control resets, and to provide proper sequencing of direct program control and cycle steal operations.

The device attachments 5-1 to 5-n control and attach I/O devices 4-1 to 4-n to the I/O Interface 2. An attachment such as 5-1 may control more than one I/O device such as 4-1.

The storage/translator interface 3 includes a main storage bus consisting of address bus 137 for addressing main storage 8, and to transfer logical and physical storage addresses between the CPU 1 and relocation translator 9, and busses 138 and 139 to transfer data between main storage 8 and the CPU 1 and between the relocation translator 9 and the CPU 1.

The interface 3 also includes the CPU/Translator Control Signal buses 127, 136 and 135 to transfer active address keys, check conditions, and synchronization signals between the CPu 1 and relocation translator 9.

The inner storage control signal bus 12 provides physical selection of the inner storage area 14, partial array selection in the selected area, and read/write control signals properly sequenced for accessing the zero to sixty-four kilobyte range of inner main storage area 14.

The console 6 provides both operator and programmer with comprehensive access to CPU 1 data flow elements and to main storage 8. It attaches to the CPU 1 by a micro-program controlled interface integrated into the data flow of the CPU 1.

Micro-Program Control (FIGS. 6–9)

Figure 6:
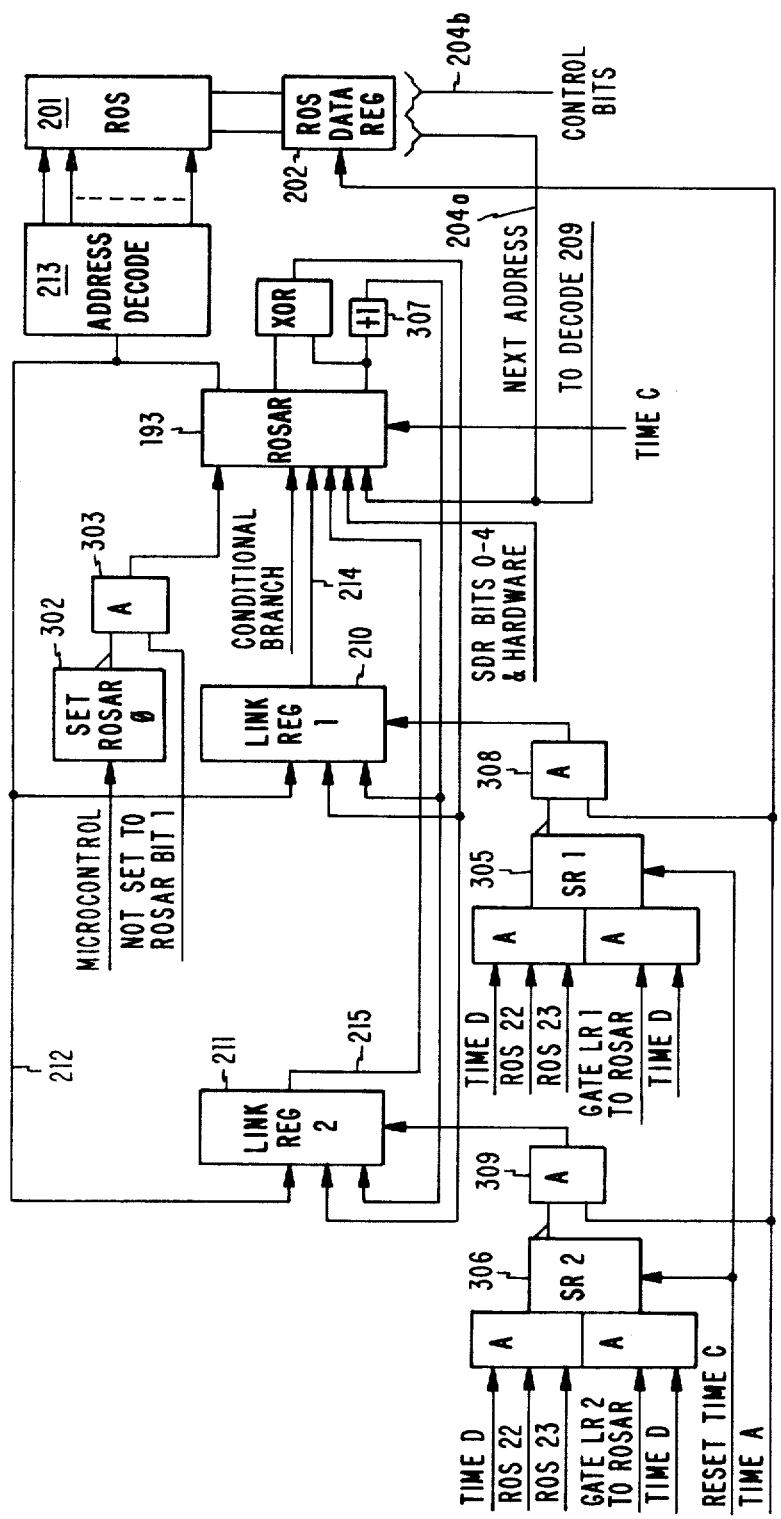
FIG. 6 is a schematic diagram of the read only storage (ROS) controls of the processor illustrated in FIGS. 2A - 2H.
Figure 7:
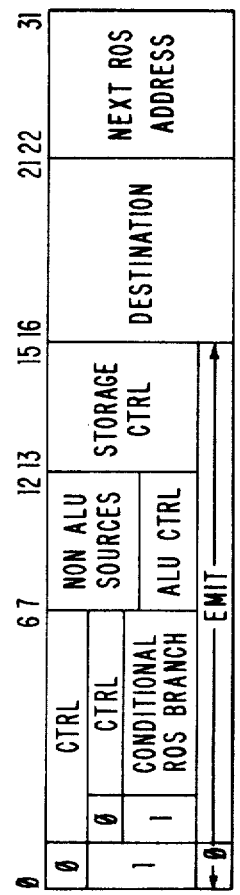
FIG. 7 shows the preferred format of the microprogram instructions.
Figure 9:
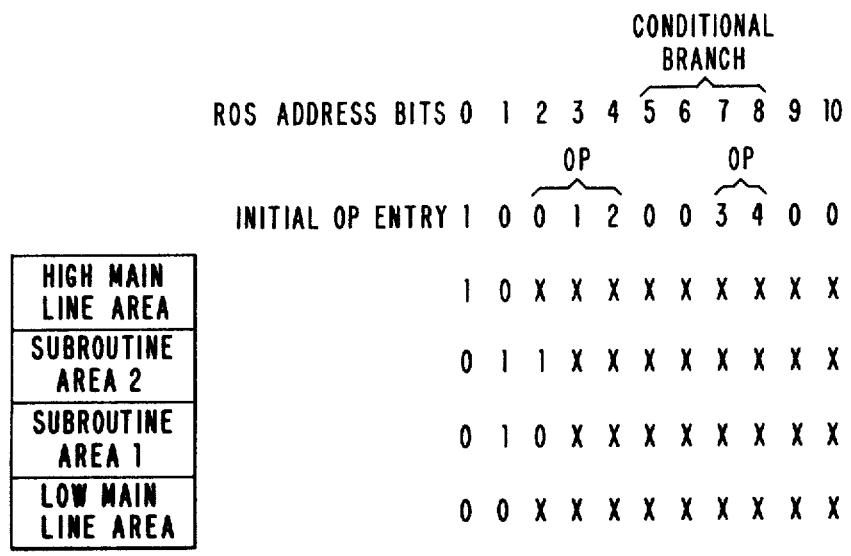
FIG. 9 is a map of the various areas in the read only storage of the present invention.

FIGS. 6 and 7 show the data flow and format of the processor 1 of the ROS controls; FIG. 8, the cycle timing; and FIG. 9 is a map of the ROS 201. The microprogram control works on the principle that each machine level instruction uses only as many microcycles as necessary. During each microcycle one "source" may be gated to the bidirectional processor bus 57 and one or more "destinations" may be loaded from this bus 57. In the preferred embodiment, it will be assumed that the processor 1 uses a 32 bit ROS 201. Twenty-two of the bits are used to control the data flow of processor 1 via bus 204b. The next address (NA) field (bits 22-31) of each ROS word supplies via bus 204a the ten low order bits to the ROSAR 193 (FIG. 6). The one high order bit of the ROSAR 193 is supplied by hardware or microcode via a set ROSAR latch 302 and AND gate 303.

The buses 204a and 204b together comprise bus 204 of FIG. 2B.

Initiation of Instruction Execution

There are five hardware force entry locations in the ROS as illustrated in FIG. 2B. Each of these entries has one or more hardware conditions (vs instructions) to force the entry, If no hardware force entry occurs, the first five bits of the instruction forces a ROS entry as shown in the upper right portion of FIG. 9. Note that on instruction force entries, the Set ROSAR latch 302 FIG. 6 is set. From this point until the end of the instruction, the Set ROSAR 10 latch 302 along with either the 10 bit Next Address (NA) field from the ROS Data Register (ROSDR) 202 or the contents of one of the 10 bit link registers (ROSLR) 210 or 211 specifies the next ROS word to be executed.

Terminating and Instruction Execution

Selected hex NA values are decoded by the hardware 205 to select a last microcycle to terminate the instruction being executed, reset the SR1 and SR2 latches 305 and 306 and initiate a new instruction via an initial entry. A reset load or a class interrupt will also terminate the instruction, reset the SR1 and SR2 latches 305 and 306 and force a branch to the start of the microcode.

ROS Link Registers and Timings

Every time C clocks the ROS Address Register (ROSAR) 193. Every time A clocks the ROSDR 202. Every time A, except when the Subroutine 1 (SR1) latch 305 is on, clocks ROSAR bits 1-8 into ROS Link Register 1 (ROSLR1) 210 bit 1-8, while ROSAR bits 9-10 go through a two bit incrementer 307, into ROSLR1 210, bits 9-10. The effect of this is to set the ROSLR1 210 to the value of the ROSAR+1 except in the case where the last 2 bits of the ROSAR 183 are both on, in which case the ROSLR1 210 is set to the value of the ROSAR-3. This is the return address from the first level subroutine back to mainline code.

Every time A, except when the SR2 latch 306 is on, clocks exactly the same value into ROSLR2 211 as described above for ROSLR1 210. This is the second level return address. The SR1 and SR2 latches 305 and 306 (which freeze ROSLR1 210 and ROSLR2 211, respectively) are clocked at Time C.

First Level Subroutine Call

A subroutine call consists of a branch to a particular area (group of ROS addresses). If a branch is made from the low mainline to subroutine area 1, (FIG. 9) the subroutine return address will be in ROSLR1 210 a the end of Time A. During Time C, the SR1 latch 305 is set, thus freezing this value in ROSLR1 210. The first level subroutine can use any of the ROS addresses except those in subroutine area 2. If a branch is made from the high mainline area to the area above the ROS 201, i.e., 11X XXXX XXXX, the AND circuit 303 between the Set ROSAR 0 latch and ROSAR bit 0 is clocked, resulting in a branch to 01X XXXX XXXX which is exactly the same subroutine call as from the low mainline.

First Level Subroutine Exit

The first level subroutine returns to mainline code by a NA hex value of 03F which is decoded as a discrete function by the hardware 209. At Time C, the SR1 latch 305 is reset and the ROSAR 193 is loaded from the ROSLR1 210, thus resuming mainline code at the previously frozen subroutine return address. Note that if the calling location was in the high mainline area, the return will be back to the high mainline area since the Set ROSAR 0 latch 302 is still on and the set to ROSAR bit 1 will be off. The last microcycle decode also forces a subroutine exit.

Second Level Subroutine Call

If a branch is made to Subroutine Area 2, the subroutine return address is frozen in ROSLR2 211 via the SR2 latch 306 in the same manner as described above for the first level call. The second level subroutine can use any of the ROS addresses.

Second Level Subroutine Exit

The second level subroutine returns to the first level subroutine by a NA hex value of 03E. At Time C, the SR2 latch 306 is reset and the ROSAR 193 is loaded from the ROSLR2 211, thus resuming first level subroutine code at the previously frozen subroutine return address. The last microcycle decode also forces a subroutine exit.

A second level subroutine can return directly to mainline by using a 03F next address. At Time C, the ROSAR 193 is loaded from ROSLR1 210, thus resuming mainline at the previously frozen subroutine return address. At the same Time C, both the SR1 and SR2 latches 305 and 306 are reset, thus allowing a new subroutine call after only one word of mainline code.

First Level Subroutine in Subroutine Area 2

If a branch is made from mainline code directly to Subroutine Area 2 (NA bits 1, 2 = 1, 1), the SR2 latch 306 is set and ROSLR 2 211 is frozen exactly as for a second level call. The exit back to mainline is next address 03E, exactly as for a second level exit. This allows a subroutine in Area 2 to be used either as a first level subroutine or a second level routine.

The returns are summarized below:

TABLE 9

| NA | ROSAR 193 Loaded | From | SR1 305-SR2 306 | | Return To | From | ID |
|---|---|---|---|---|---|---|---|
| 03F | ROSLR1 | | On | Off | Mainline | 1st Level | Area 1 |
| 03F | ROSLR1 | | On | On | Mainline | 2nd Level | Area 2 |
| 03E | ROSLR2 | | On | On | 1st Level | 2nd Level | Area 2 |
| 03E | ROSLR2 | | Off | On | Mainline | 1st Level | Area 2 |

03F resets both the SR1 and SR2 latches
03E resets only the SR2 latch.

Conditional ROS Branching Logic 152

The processor has 4-way, 8-way and 16-way conditional ROS branches. If a conditional branch is selected and the condition is met, the appropriate NA bit is forced on. If one of the NA bits is already on, that condition is a don't care, hence all 4-way branches can be subdivided into 2-way branches, 16-way branches can become 12-way branches, etc.

The NA bits which participate in conditional ROS branches are bits 5–8. Since the NA bits used for returns are bits 9–10, there can be used with conditional ROS branches to do conditional subroutine returns.

For example, if location 00011000010 did a first level subroutine call and the subroutine did a 4-way conditional ROS Branch return, the four return addresses are:

00011000011
00011010011
00011100011
00011110011

ROS BIt Decodes

The control decodes control various operations in the CPU 1. The conditional ROS branches allow the microcode to branch different places depending on machine conditions. The source field specifies what source is to be gated onto the processor bus 57. The destination field specifies one or more destinations to be loaded from the processor bus 57. The next address field specifies the next ROS word to be executed.

Emit Field

There are four destination decodes that not only specify the destination but also to emit ROS bits 0–15 to the processor bus 57 as a source. There are twelve destination decodes that specify to emit ROS bits 8–15 to the processor bus 57. This allows the use of the control/conditional branch field in the same ROS word as the 8 bit Emit. Main Storage Control Decodes - ROS Bits 13–15 (Not Emit)

| Value | | Function |
|---|---|---|
| 0 | No storage cycle | |
| 1 | SR - | Change the next LW or SW to Load or Store Segmentation Register if translator is installed. If translator is not installed, set invalid function program check. |
| 2 | BR - | Block the next LW or SW. The next LIW, LUW, LW or SW can be executed in the second microcycle after the blocked LW or SW. |
| 3 | SBY - | Change the next LW or SW into a byte request instead of a word request. Change the next clock result indicator into a clock byte result indicator and inhibit changing byte 0 in the same word. |
| 4 | LIW - | Load instruction word into SDR using ISK. |
| 5 | LUW - | Load unconditional word into SDR using OPK. |
| 6 | LW - | Load data word (two bytes) into SDR. |
| 7 | SW - | Store data word from SDR into storage. |

Operation

The normal storage requests are LIW, LW, and SW. All the others modify these. The four modifying storage control decodes are used to modify common subroutines. The SR, BR, and SBY decodes are executed before a common subroutine containing the LW or SW they are to modify. These three have no effect on LIW. The BTR decode is executed immediately following a LIW, LW, or SW in the last word of a common subroutine.

The SBY decode not only modifies later storage control decodes (LW and SW), but also modifies later clocking of result indicators to operate only on 8 bits instead of 16 bits.

Priority of Modifying Requests

BR is top priority and resets SR and SBY
SR is second priority and resets SBY
SBY is lowest priority FIGS. 10 – 14 have been shown to illustrate various cycle timings in the preferred processor within which implementation of the improvement is intended.

Figures 10, 11:
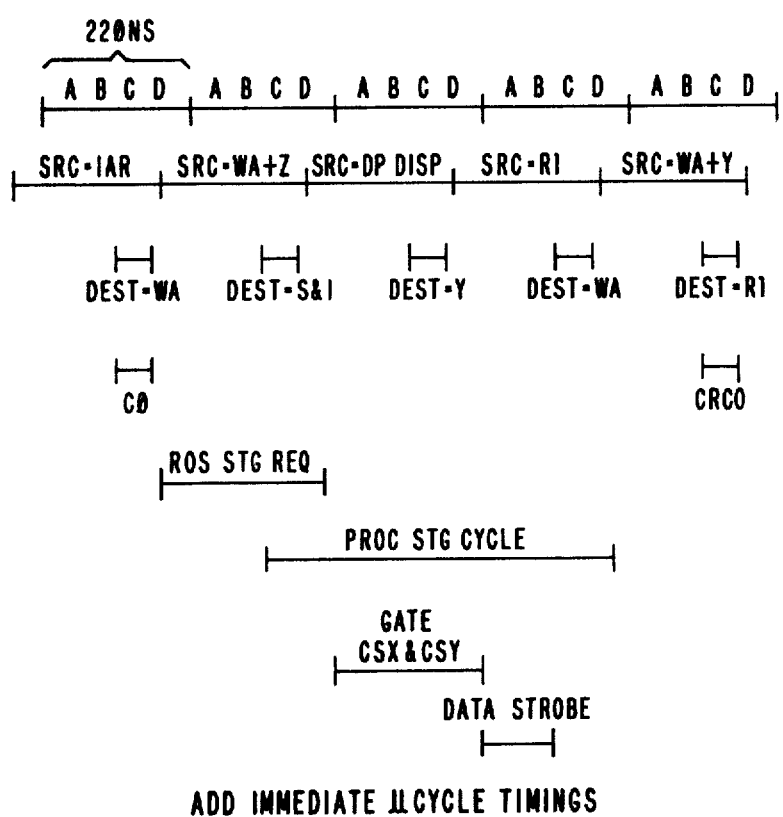
FIGS. 10 and 11, respectively, illustrate the microprogram routine which is executed to perform an exemplary machine level instruction "add immediate" and the basic timing cycles for the add immediate routine.

FIG. 10 illustrates the five microinstructions which are executed to perform a machine level Add Immediate instruction and FIG. 11 illustrates the timing of the source, destination and storage accessing during the execution of the five microinstructions.

Figure 12:
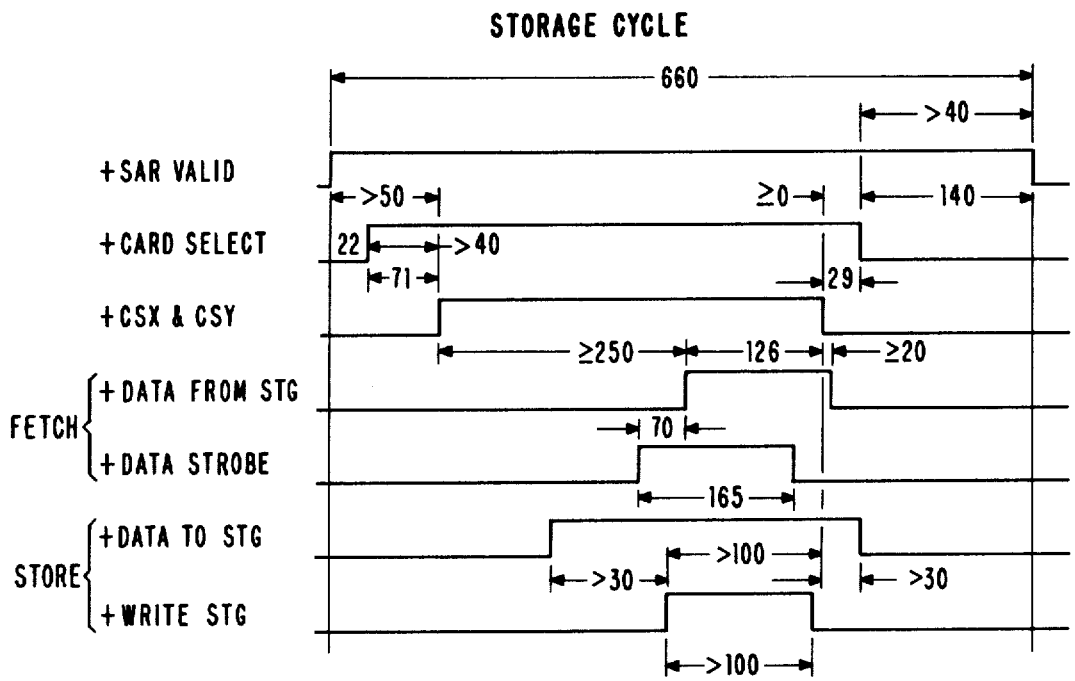
FIG. 12 illustrates the timing of storage cycles.

FIG. 12 illustrates the cycle timings of the main storage controls.

Figure 13:
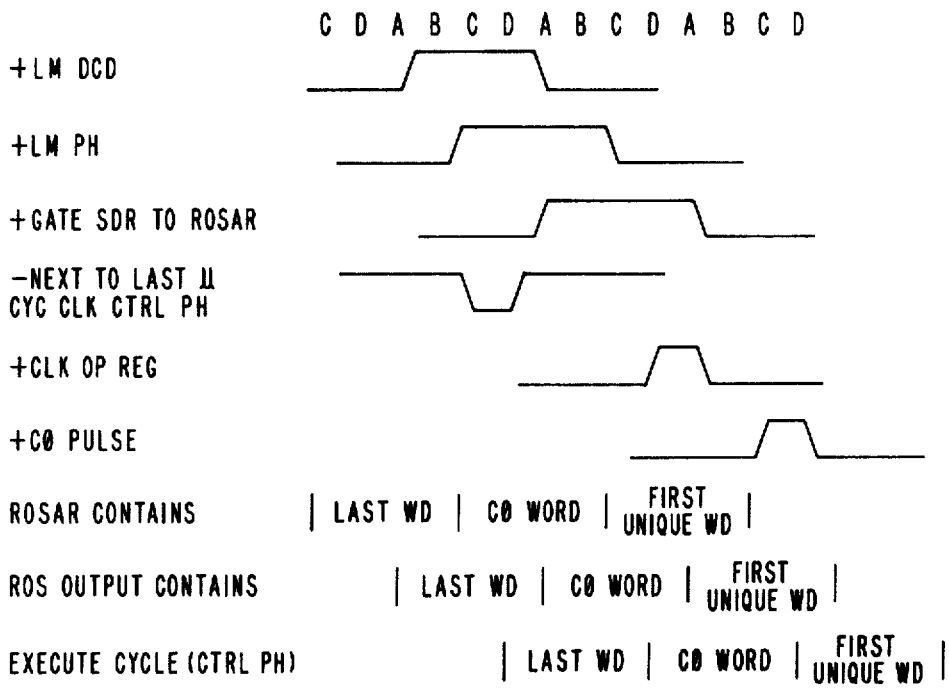
FIGS. 13 and 14 are timing diagrams which illustrate the execution of the last microprogram word in each machine level execution routine.
Figure 14:
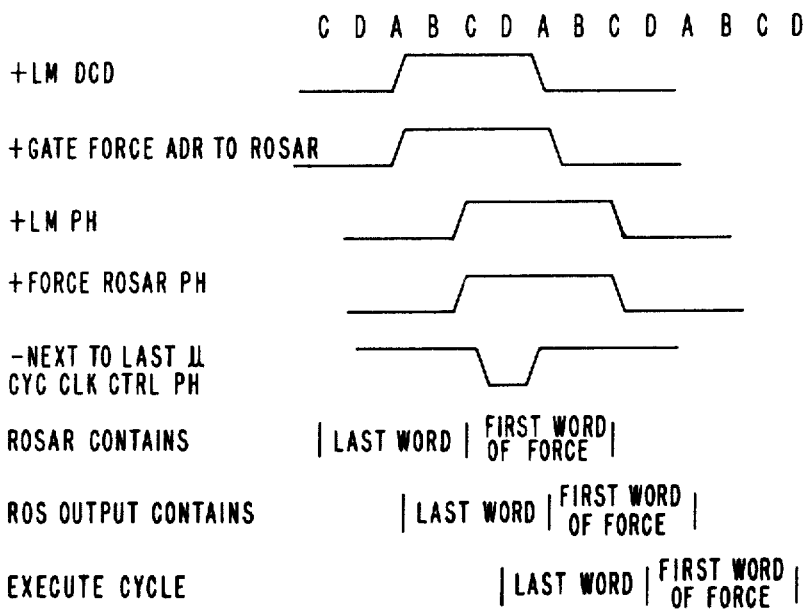

FIGS. 13 and 14 illustrate the cycle timings of the microinstruction type which is executed as the last microinstruction of each routine for executing machine level instructions. Depending upon the detection of (or failure to detect) a sampled condition, either the timing of FIG. 13 or FIG. 14 is effected.

Interruptions

Efficient operation of a central processor such as 1 depends on prompt response to I/O device service requests. This is accomplished by an interruption scheme that stops the current processor operation, branches to a device service routine, handles device service, then returns to continue the interrupted operation. One processor 1 can control many I/O devices 4–1 to 4–17; therefore, an interruption priority is established to handle the more important operations before those of lesser importance. Certain error or exception conditions (such as a machine check) also cause interruptions. These are called class interruptions and are processed in a manner similar to I/O interruptions.

Interruption priority is established by four priority levels of processing. These levels, listed in priority sequence, are numbered 0, 1, 2 and 3 with level 0 having highest priority. Interruption levels are assigned to I/O devices 4–1 to 4-n via program control. This provides flexibility for reassigning device priority as the application changes.

Each of the four priority levels has its own set of registers LSB level 0 to LSB level 3 in a stack 80 as shown in FIG. 4. These consist of an address key register (AKR), a level status register (LSR), eight general registers (R0-R7), and an instruction address register (IAR). Information pertaining to a level is automatically preserved in these stack hardward registers when an interruption occurs.

I/O and class interruptions include automatic branching to a service routine. Fixed locations in main storage 8 are reserved for branch addresses or points which are referenced during interruption processing. Hardward processing of an interruption includes automatic branching to a service routine. The processor 1 uses a reserved storage area in main storage 8 for branch information. The reserved area begins at main storage address 0030. The total size of the area depends on the number of interrupting devices 4-1 to 4-n attached. One word (two bytes) is reserved for each interrupting device.

The storage locations used for a class interruption each include a level status block (LSB) pointer which points to the first address of an area in main store 8 where a level status block is stored, and a start instruction address (SIA) which points to the first instruction of the service routine.

Each storage word used for an I/O interruption contains a device data block (DDB) pointer which is the address of the first word of a device data block. This word is used to obtain the start instruction address for the service routine.

Interruption masking facilities provide additional program control over the four priority levels. System and level masking are controlled by a summary mask and the interrupt level mask register 175. Device masking is controlled by a device mask in the information transmitted by the Prepare I/O command. Manipulation of the mask bits can enable or disable interruptions on all levels, a specific level, or for a specific device.

As previously stated, four priority interruption levels exist. Each I/O device 4-1 to 4-$n$ is assigned to a level dynamically, dependent on the application. When an interruption on a given level is accepted, that level remains active until a level exit (LEX) instruction is executed or a higher priority interruption is accepted. In the latter case, the processor 1 switches to the higher level, completes execution (including a LEX instruction), then automatically returns to the interrupted-from level. This automatic return can be delayed by other higher priority interruptions.

If an interruption request is pending on the currently active level, it will not be accepted until after execution of a LEX instruction by the current program. If no other level of interruption is pending when a level exit instruction is executed, the processor 1 enters the wait state. In the wait state no processing is performed, but the processor can accept interruptions that are expected to occur.

Supervisor state is entered upon acceptance of all priority interruptions. The priority interruption algorithm is:

1. The summary mask must be on (enabled).
2. The mask bit (interrupt level mask register 175) for the interrupting level must be on (enabled).
3. For I/O interruptions the device must have its device mask bit on (enabled).
4. The interruption request must be the highest priority of the outstanding requests and higher than the current level of the processor.
5. The processor must not be in the stop state.

Class interruptions do not change priority levels. They are processed at the currently active level. If the processor is in the wait state when a class interruption occurs, priority level 0 is used to process the interruption.

In addition to the above-described interrupt condition, program-controlled interrupt switching is provided using the LLSB and STLSB instructions as described in Application Ser. No. 681,953 (U.S. Pat. No. 4,047,161) by M. I. Davis et al. This mechanism provides efficient software task management.

Bit Field Instructions

Figure 16:
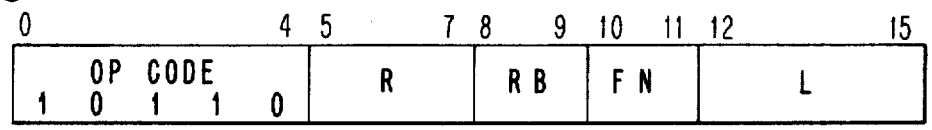
FIG. 16 illustrates the format of the four new instructions realized with this invention.

In order to attain the capability of storing variable length bit fields into memory and of loading such fields into a register from memory, independently of the boundaries of addressable elements, this invention provides means for recognizing and executing four new instructions. The format of the new instructions is illustrated in FIG. 16. As shown in FIG. 16, each of the instructions in the preferred embodiment contains 16 bits. The first five bits (bit 0 through 4) are the operation code. These four instructions all have the same operation code (10110). The next three bits (bits 5 through 7) specify a machine register R which is the source (when executing a store instruction) or the destination (when executing one of the three load instructions) of a bit field. The next two bits (bits 8 and 9) specify a register RB which contains the address of an element of addressability (e.g., a byte, or a word) within the memory. The address will be utilized as a base address. The next 2 bits (FN) in the instruction (bits 10 and 11) will be decoded by the system to indicate which particular one of these four new instructions is to be executed. The final 4 bits L (bits 12 through 15) contain a binary number which is one less than the length of the bit field. Thus, bit fields that are as long as 16 bits in length may be accommodated. Besides the machine registers that are explicitly specified by the instruction illustrated in FIG. 16, one other machine register is of primary significance. In this preferred embodiment, one particular general register, general register 7 (R7), is always utilized to hold a signed displacement from the boundary addressed by the contents of the register specified by RB. This signed displacement in R7 consists of a signed byte displacement in the upper 13 bits of the register and a bit displacement (from the byte boundary) in the lower three bits of the register.

In executing one of these instructions, the effective bit address of the first bit in the bit field is calculated by first determining the storage byte in which the bit field begins. This is done by adding the contents of the register specified by RB to the signed byte displacement (the thirteen high-order bits) of R7. In performing this addition, the byte displacement bits of R7 must be right-justified. The original three low-order bits of R7 determine the bit within this byte that is the beginning of the desired bit field.

The four instructions that are included within the preferred embodiment of this invention are three load instructions, each of which may be utilized to load a bit field into a specified register from storage, and one store instruction which is used to put into storage a bit field contained in a specified register. The four instructions function as described below.

Load Field (LF): FN = 00. The specified bit field is loaded into register R from storage. The field is right-justified in register R with zeros filling out the high-order bits. The system result indicators are changed to reflect the final value loaded into register R.

Load Field and Increment (LF+): FN = 01. The specified bit field is loaded into register R. The field is right-justified within register R with zeros filling out the high-order bits. A value equal to L + 1 is added to R7 and replaces the contents of R7, thus updating it to point to the beginning of the next bit field. The system result indicators are changed to reflect the final value loaded into register R.

Decrement and Load Field (LF−): FN = 10. A value of L + 1 is subtracted from R7 and replaces the contents of R7. The specified bit field is then loaded into register R and is right-justified in register R with zeros filling out the high-order bits. This enables a string of bit fields to be processed from right to left. The system result indicators are changed to reflect the final value loaded into register R.

Store Field (STF): FN = 11. The low-order L + 1 bits of register R are stored into the specified storage field without disturbing any other bits.

Figure 17:
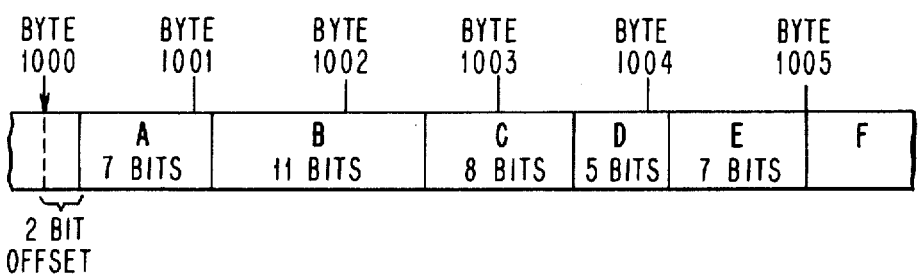
FIG. 17 shows an example of the use of the "load field and increment" instruction to access variable length bit fields within packed data.

An example of the use of the Load Field and Increment (LF+) instruction will now be given. FIG. 17 illustrates a portion of memory which contains five bit fields A, B, C, D and E containing seven bits, eleven bits, eight bits, five bits and seven bits, respectively. As shown in FIG. 17, it is assumed that the first bit in field A is offset by two bits from the starting boundary of byte location 1000 (that is, the first bit in field A is the third bit in the thousandth byte in memory). Assume it is desired that fields A, B, C, D and E be loaded into the five machine registers R1, R2, R3, R4 and R5, respectively. A computer program for accomplishing this would need first to initialize a base register RB and register R7. Assuming that register R0 is to be used as the base register, initialization could consist of an instruction which loads R0 with 1000 and an instruction which loads R7 with 2. (The high-order thirteen bits of R7 would, in this example, indicate a byte displacement of 0.) After initialization, the loading of the five registers R1 through R5 can be easily accomplished by the following five instructions.

$LF+ R = R1, RB = RO, L = 6$
$LF+ R = R2, RB = RO, L = 10$
$LF+ R = R3, RB = RO, L = 7$
$LF+ R = R4, RB = RO, L = 4$
$LF+ R = R5, RB = RO, L = 6$

After executing these five instructions, registers R1 through R5 will have been loaded with bit fields A through E, respectively, and each of the bit fields would have been right-justified in its register, with zeros filling the high-order register positions. R7 will have been incremented to contain the binary number 101000 (equal to the decimal number 40) and the system will be ready to load the next field F if it should be of interest. (If field F is of no interest, the fifth instruction above could have been LF instead of the LF+.) As was described above, the contents of R7 represent a byte displacement (in the high-order 13 bits) and a bit displacement (in the low-order three bits). In this example, the binary number 101000 in R7 represents a byte displacement of 101 (equal to decimal 5) and a bit displacement of 000. This correctly points to the beginning of bit field F which is displaced five bytes from the address indicated in the base register R0. Of course, the example would have worked just as well if R0 had been initialized with some other number such as, for example, 456 and the high-order (byte displacement) portion of R7 had been initialized with a number equal to 1000 minus the contents of R0, in this case 544.

Those skilled in the art will recognize that this invention could be implemented on a given processor with sequential logic, or microprogramming or a combination of both. The specific manner of implementation will largely depend upon constraints imposed by the environmental system. Therefore, the best way to describe a preferred implementation of the invention is to present the following description of the elemental steps utilized in executing the above instructions in the exemplary environmental system described herein. The description provides a clear definition of sequential logic that could be used to implement the invention. It also provides a clear definition of microinstructions that could be used.

Figure 18A:
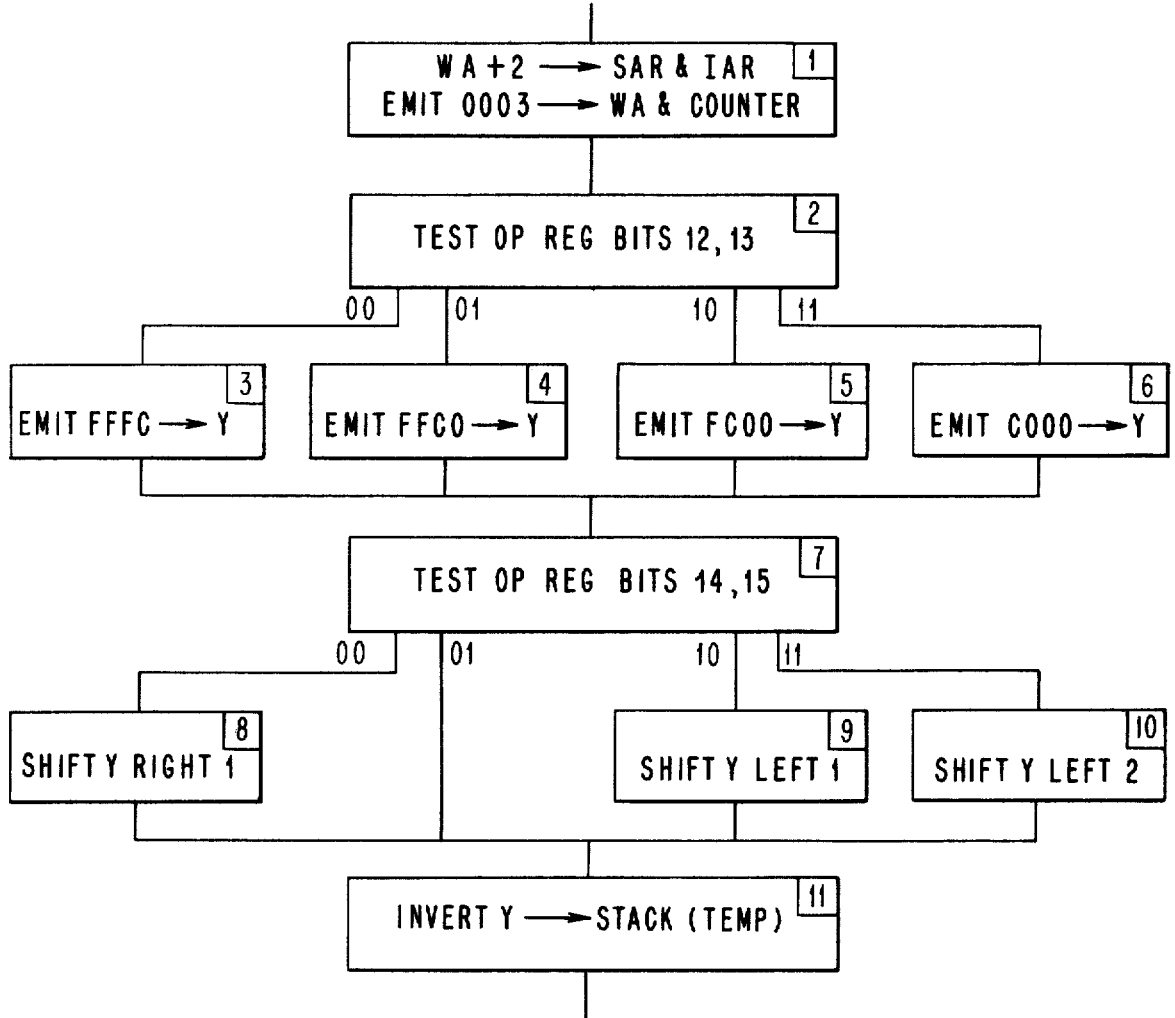
FIG. 18 describes the microcode which may be used to implement a preferred embodiment of the invention in the exemplary data processing system.
Figure 18B:
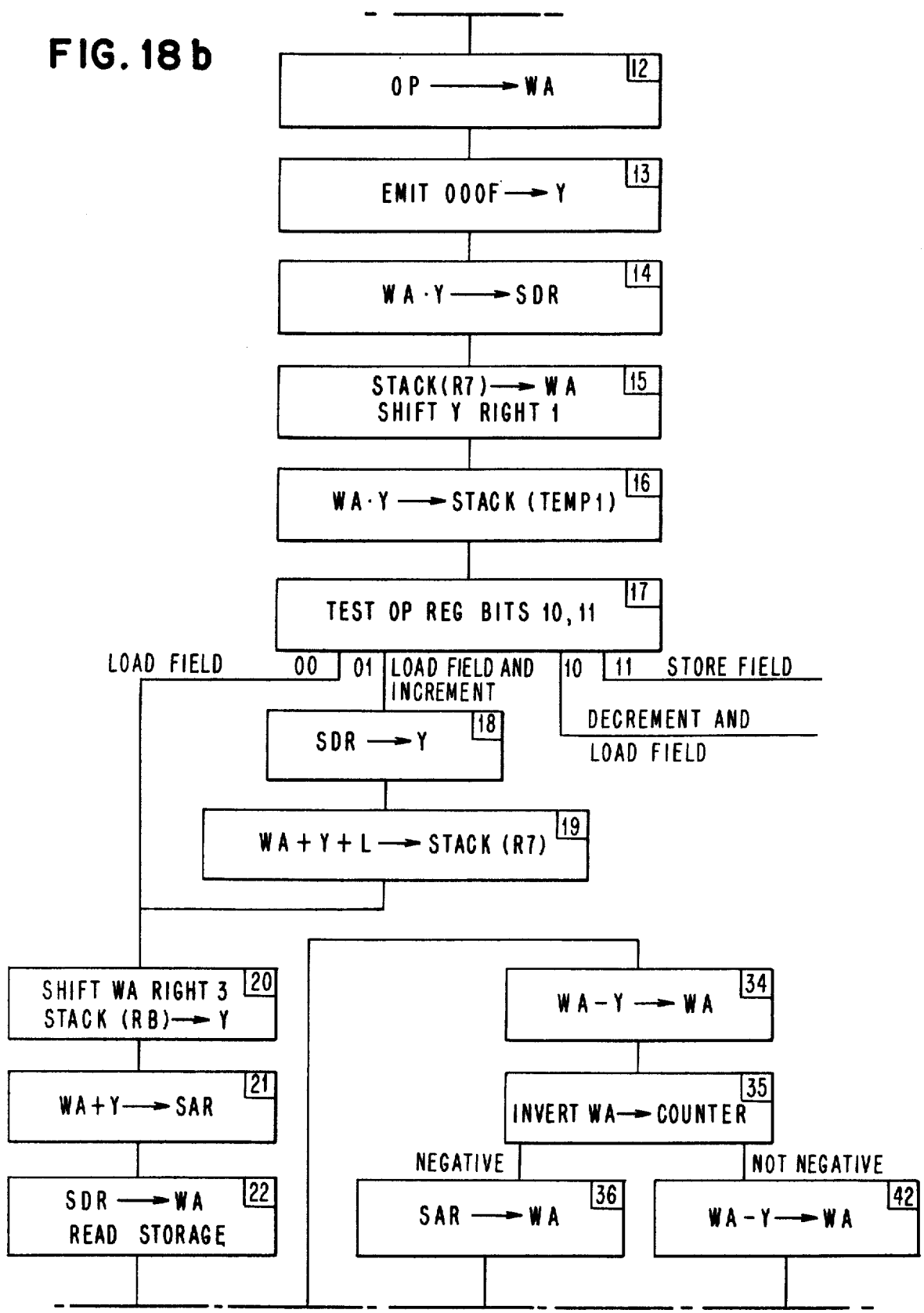
Figure 18C:
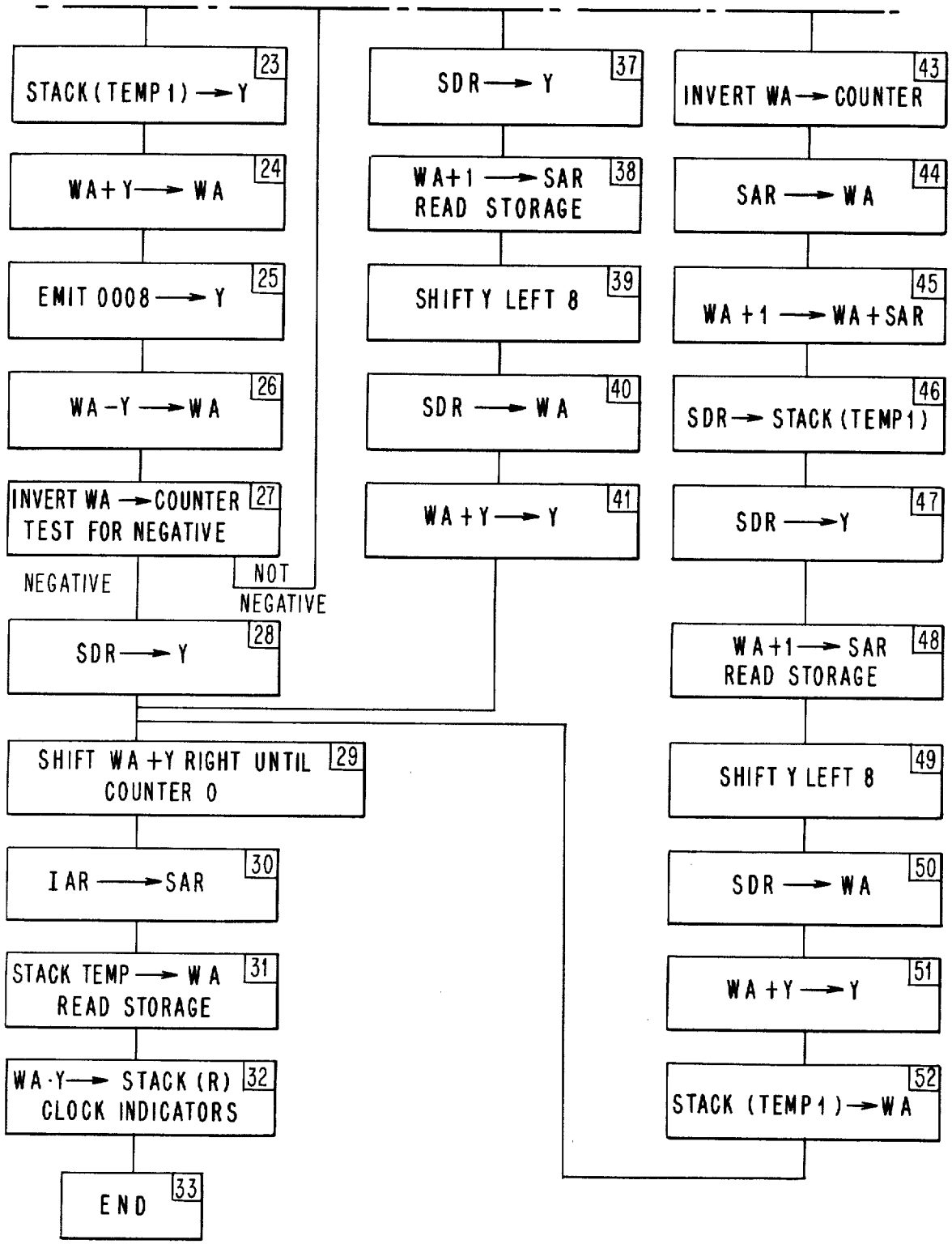

Initial Conditions: Assume that one of the above instructions is in the OP register; its address is in the work area (WA) register; the base byte address is in a register RB; the displacement is in general register R7 and the target register is R. Referring to FIG. 18, the controls are described as follows.

The instruction address is incremented by 2 and stored into the storage address register and into the instruction address register for use in fetching the next sequential instruction following the end of this one (see Block 1). (As will become evident later, the storage address register will in fact get overwritten during the course of execution of the instruction. However, the destination control is common between the storage address register and the instruction address register, so it was convenient to put the updated instruction address in both.) A value of "3" is also emitted to the work area and to a counter. (In this description all numerical values are expressed in decimal notation unless otherwise stated.) The function of the next ten blocks is to form a mask of right-justified one-bits equal in length to a value that is one greater than the length specified in the L field of the instruction. To this end a test is made (Block 2) of the most significant bits of the L field (that is, bits 12 and 13) and a ones complement value is emitted to the Y register (Blocks 3, 4, 5 and 6 expressed as hexadecimal numbers). As shown in Block 7, the two less significant bits (14 and 15) are tested and the value in the Y register is shifted left or right (Blocks 8, 9 and 10) the appropriate amounts to form the ones complement mask. The mask is then inverted and stored in a location known as TEMP in the stack (Block 11). The contents of the OP register (that is, the instruction) are moved to the work area (Block 12) and immediately following this, an emit field of 000F (hexadecimal) is moved to the Y register (Block 13). Then (Block 14) WA and Y are ANDed together and the result placed in the storage data register. The effect of the operations shown in Blocks 12, 13 and 14 is to copy just the length field from the instruction into the storage data register where it is retained for later use. Then register 7, which contains the signed bit displacement, is fetched and moved to the work area (Block 15). In the same cycle the Y register is shifted right one position so that the value in it at the end of the microcycle is 0007. Then these two values (that is, work area and register) are ANDed together and again placed in the local storage stack in the location known as TEMP 1 (Block 16). At the end of this, TEMP 1 contains the low-order three bits of the bit displacement and is subsequently used to indicate the starting bit number for the selected bit field. As shown in Block 17, a test is made of the OP register bits 10 and 11. A value of 00 in this field corresponds to "Load Field". 01 corresponds to "Load Field and Increment". 10 and 11 correspond respectively to "Decrement and Load Field" and to "Store Field".

Taking the 01 leg out of Block 17 (Load Field and Increment ) the system retrieves (Block 18) the length of the bit field which was previously stored in the storage data register (see Block 14) then adds the original value of the signed bit displacement (which is in WA) to the length of the current bit field operation (which is in Y) and an additional "1" so that the result points directly to the next bit field to be handled via the subsequent field instruction (Block 19). The result of this is placed into the register stack in the position for register 7 for the current level. The apparatus defined by Blocks 18 and 19 has caused the value of the signed bit displacement to be incremented by the length plus 1 to effect an automatic update of the bit pointer. The apparatus described below is common to both Load Field and Load Field and Increment.

The system then sets up the byte address of the location containing the first bit of the field. The work area which contained the bit displacement is shifted right 3 (Block 20) to strip off the bit identifiers and leave a byte address. In the same cycle, the base address from RB is fetched from the register stack and moved to the Y register. As shown in Block 21, WA and Y are then added and the result is placed in the storage address register which then contains the effective byte address of the byte holding the first bit of the selected field. Then (Block 22) the storage data register is copied into the work area. (The storage data register held the length of the bit field but must now be considered volatile since a storage cycle is about to take place. On all storage cycles the storage data register is set to storage data, so we must first copy it into the work area). A read of main storage is also called in this cycle to get the first byte. The bit number is retrieved from TEMP 1 in the register stack and moved to the Y register (Block 23). (Note that references to the register stack refer to that part of the hardware in the exemplary environmental system which contains the general purpose registers, the level status registers, the address key registers, and also contains buried internal registers such as TEMP and TEMP 1 which are used as internal work areas and are not directly accessible to a programmer.). The bit number is now back in the Y register. We add it to the length (Block 24) and then (Blocks 25 and 26) subtract a constant of "8" from the sum of the length plus the starting bit number. The purpose of this operation is to determine whether or not the starting bit position and the length of the bit field are such that overflow into the next byte of main storage will occur. This test is indicated in Block 27.

If the result of the subtraction indicated in Block 26 is negative, it implies that the bit field does not stretch into the next byte position, and so the contents of the storage data register will be moved to the Y register (Block 28). The byte moved from the storage data register to the Y register will in fact contain the beginning and end of the bit field in this case, since it has been determined that the bit field does not overflow the boundaries of this byte. Then the W and Y registers are shifted right and a counter is decremented with each shift until the counter is zero. (The counter was set up with the appropriate value as shown in 27.) When the counter has gone to zero, the byte will have been shifted as far to the right as is appropriate and will be in the righthand byte position of the Y register. The instruction address register contents is then transferred to the storage address register to set up the accessing of the next sequential instruction (Block 30). As shown in Block 31 the value TEMP which contains the mask established as shown in Blocks 2 through 11 is loaded into the work area and a read of main storage to fetch the next sequential instruction, preferably overlapped (for optimum performance) with the end of the execution of this instruction, is performed. Then the work area and Y are ANDed together and placed in the target register in the register stack (Block 32). The effect of this is to place the appropriate bits of the byte in the Y register, as specified by the bit field parameters, into the register specified by the R field. The clocking of the result indicators to indicate the characteristics of the value just stored into the register than completes the instruction execution.

If the test shown in Block 27 was not negative, then the bit field certainly overlaps into the next byte, and may in fact overlap into a third byte. In this cycle, the constant of value "8" which was in the Y register is again subtracted from the sum length plus bit number (Block 34) to determine whether or not the bit field length laps into only one more byte or two more bytes. The result of the subtraction is inverted and a test for negative is performed (Block 35).

If the result is negative (i.e., the bit field occupies two bytes) the storage address used for the first byte is moved to the work area (Block 36). As shown in Block 37 the storge data register (which contains the first byte fetched due to the request shown in Block 22) is loaded into the Y register. Then the previous storage address for the first byte is incremented by one and restored to the storage address register and a further request to main storge is made (Block 38). The Y register is shifted left eight positions (Block 39) to allow subsequent merging of the previous byte and the current byte. By this time the byte has been read into the low-order byte position of the storage data register and it is copied into the work area (Block 40). The work area is then ORed with the Y register and the result placed in the Y register (Block 41). This has the effect of merging the two appropriate bytes together into the Y register with the most significant one occupying bit positions 0–7 and the least significant one occupying bit positions 8–15. The main line execution apparatus is now rejoined at Block 29 where right justification of the bit field, loading of the target register R, clocking of the result indicators and next instruction fetch continues.

When the bit field extends over three bytes, the test for negative (Block 35) will be followed by subtraction of yet another value of 8 from the work area (Block 42) and placement into the counter of the appropriate number of bit positions to be shifted (Block 43). The storage address register is copied into the work area (Block 44), the operand address in main storage is again incremented by 1 (Block 45) and main storage is read. The storage data register contents is saved in TEMP 1 (Block 46) which already contains the first byte fetched from main storage. The contents of the storage data register (which had been set by the storage request shown in Block 45) are moved into the Y register (Block 47). This register then contains the second byte associated with the bit field. The work area (which contained the storage address of that byte) is incremented by "1" and replaced in the storage address register to address the third byte (Block 48). Main storage is called in this cycle. Then the Y register is shifted left "8" (Block 49) to accommodate the least significant byte which is about to arrive from main storage and which, after its arrival, is moved to the work area (Block 50). The second and third bytes are ORed together and thus concatenated (Block 51). Then the most significant byte is retrieved from TEMP 1 in the stack and placed in the work area (Block 52). We then return to Block cycle 29 for the common ending execution where the whole value of work area and Y is shifted right until the counter is O, and termination of the instruction proceeds as before.

The preceding detailed description of specific implementations of "Load Field" and of "Load Field and Increment" are sufficient to teach those skilled in the art exactly how to implement other instructions that might be included as part of this instruction. Therefore, there is no need to present similar detailed descriptions of "Decrement and Load Field" or of "Store Field".

Those skilled in the art will recognize that many variations to the preferred embodiment described above could be made in implementing this invention. The variations will depend primarily upon two factors, (1) constraints imposed by a system in which this invention is embodied, and (2) the particular requirements of desired applications.

For example, the maximum allowable length of a bit field could be something other than 16. If five bits in the instruction are available for specification of L, fields of up to 31 bits could be handled. If only three instruction bits were available to specify L, then eight bits would be the maximum field length.

Also, it will not always be essential that the displacement register (R7 in the preferred embodiment) be prespecified. If the architecture of the environmental system permits it, the programmer could specify the displacement register.

Alternatively, the destination register R and/or the base register RB could be prespecified instead of being selectable by the programmer. However, in the vast majority of applications a significant amount of flexibility would be lost if the programmer were not given the option to specify at least the destination (source) register R.

In the preferred embodiment, each of the four instructions was shown to have the same operation code, with further definition provided by the field FN. Whether the invention is implemented in this particular manner, or whether two or more totally distinct operation codes are used for the instructions will generally be determined by the architecture of the environmental system.

It also is not essential that there be exactly three different load instructions and only a single store instruction. There could be more than three, or fewer than three load instructions and there could be a similar variety of store instructions. A determination of which types of load and store instructions should be implemented will depend primarily upon the intended usage of the system.

While the invention has been particularly shown and described with reference to a preferred embodiment thereof, it will be understood by those skilled in the art that the above and other changes in form and details made by made therein without departing from the spirit and scope of the invention.

What is claimed is:

1. A method of operating an electronic data processing system so as to permit a single bit-field instruction to cause access of variable length bit fields in a storage of said system without requiring any special relation between the boundaries of addressable elements within said storage and the beginning and end of the bit fields, comprising the steps of:

initializing a base register RB of said system to contain a base address of an addressable element;
   initializing a displacement register R7 to contain (1) the element displacement, from said base address, of the addressable element containing the first bit of a desired bit field, and (2) the bit displacement, from a boundary of the last recited addressable element, of said first bit; reading into an instruction register of said system a bitfield instruction which contains (1) an operation code identifying it as a load instruction or a store instruction for causing access of a bit field, (2) an identification of which register in said system shall be used as RB, (3) an identification of another register R in said system which is to be used as the destination of a bit field to be loaded into R from storage or the source of a bit field to be stored from R into storage and (4) a number L indicating the number of bits in said particular bit field;
   adding said element displacement to the contents of register RB;
   concatenating said bit displacement to the result of said addition, thereby providing an indication of the location in storage of said first bit; and
   beginning with said first bit, either loading said number of bits into R from storage or storing said number of bits from R into storage depending upon whether said bit-field instruction is a load instruction or a store instruction, respectively.

2. The method of claim 1 including the additional step of combining a number equal to said number of bits with the portion of R7 containing said bit displacement in order to initialize R7 with respect to a bit field immediately adjacent in storage to said particular bit field.

3. In an electronic data processing system, apparatus responsive to a single bit-field instruction to cause access of variable length bit fields in a storage of said system without requiring any special relation between the boundaries of addressable elements within said storage and the beginning and end of the bit fields, comprising:

a plurality of registers, each usable as a base register;
   means for initializing a base register RB of said system to contain a base address of an addressable element;
   a displacement register R7;
   means for initializing said displacement register R7 to contain (1) the element displacement, from said base address, of the addressable element containing the first bit of a desired bit field, and (2) the bit displacement, from a boundary of the last-recited addressable element, of said first bit;
   an instruction register;
   means for reading into said instruction register of said system a bit-field instruction which contains (1) an operation code identifying it as a load instruction or a store instruction for causing access of a bit field, (2) an identification of which register in said system shall be used as RB, (3) an identification of another register R in said system which is to be used as the destination of a bit field to be loaded into R from storage or the source of a bit field to be stored from R into storage and (4) a number L indicating the number of bits in said particular bit field;
   means for adding said element displacement to the contents of register RB;
   means for concatenating said bit displacement to the result of said addition, thereby providing an indication of the location in storage of said first bit; and
   means for beginning with said first bit, either loading said number of bits into R from storage or storing said number of bits from R into storage depending upon whether said bit-field instruction is a load instruction or a store instruction, respectively.

4. The apparatus of claim 3 further including means for combining a number equal to said number of bits with the portion of R7 containing said bit displacement in order to initialize R7 with respect to a bit field immediately adjacent in storage to said particular bit field.

* * * * *